United States Patent
Onishi et al.

(10) Patent No.: US 9,201,740 B2
(45) Date of Patent: Dec. 1, 2015

(54) COMPUTER SYSTEM, CLUSTER MANAGEMENT METHOD, AND MANAGEMENT COMPUTER

(71) Applicant: HITACHI, LTD., Tokyo (JP)

(72) Inventors: Yoji Onishi, Fujisawa (JP); Norihiro Naka, Yokohama (JP); Yoshifumi Takamoto, Kokubunji (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 13/824,575

(22) PCT Filed: Nov. 22, 2012

(86) PCT No.: PCT/JP2012/080326
§ 371 (c)(1),
(2) Date: Mar. 18, 2013

(87) PCT Pub. No.: WO2014/080492
PCT Pub. Date: May 30, 2014

(65) Prior Publication Data
US 2015/0254143 A1  Sep. 10, 2015

(51) Int. Cl.
*G06F 11/00* (2006.01)
*G06F 11/14* (2006.01)
*G06F 11/20* (2006.01)

(52) U.S. Cl.
CPC ........ *G06F 11/1469* (2013.01); *G06F 11/1451* (2013.01); *G06F 11/1464* (2013.01); *G06F 11/203* (2013.01); *G06F 11/2092* (2013.01); *G06F 2201/84* (2013.01)

(58) Field of Classification Search
CPC ............ G06F 2201/84; G06F 11/1469; G06F 11/1451; G06F 11/1464; G06F 11/203; G06F 11/2053; G06F 11/2056; G06F 11/2089; G06F 11/2092
See application file for complete search history.

(56) References Cited

U.S. PATENT DOCUMENTS

| | | | |
|---|---|---|---|
| 8,468,383 B2 * | 6/2013 | Bower et al. | 714/4.1 |
| 8,495,645 B2 * | 7/2013 | Takano et al. | 718/104 |
| 8,769,545 B2 * | 7/2014 | Takano et al. | 718/104 |
| 2004/0139128 A1 * | 7/2004 | Becker et al. | 707/204 |
| 2007/0180314 A1 * | 8/2007 | Kawashima et al. | 714/15 |

(Continued)

FOREIGN PATENT DOCUMENTS

| | | |
|---|---|---|
| JP | 11-238044 A | 8/1999 |
| JP | 2000-112906 A | 4/2000 |

(Continued)

*Primary Examiner* — Bryce Bonzo
*Assistant Examiner* — Anthony J Amoroso
(74) *Attorney, Agent, or Firm* — Mattingly & Malur, PC

(57) ABSTRACT

A computer system, comprising: a plurality of computers; and a management computer for managing a cluster which includes the plurality of computers, the cluster include a plurality of first computers each of which executes a service and a plurality of second computers for taking over the service, wherein the management computer includes: a backup obtaining module; and a restoration pair management module, wherein the restoration pair management module is configured to: sort the plurality of first computers into a plurality of groups of first computers by which a software configuration for providing the service is common; generate at least one restoration pair for each of the plurality of groups by associating at least one first computer that is included in one group with at least one second computer; determine a common image for each of the plurality of restoration pairs.

18 Claims, 21 Drawing Sheets

(56) References Cited

U.S. PATENT DOCUMENTS

2008/0294933 A1* 11/2008 Nishii et al. .............. 714/5
2009/0138753 A1* 5/2009 Tameshige et al. ........ 714/4
2011/0295809 A1* 12/2011 Tatebe et al. ............ 707/640

FOREIGN PATENT DOCUMENTS

| JP | 2009-129148 A | 11/2009 |
| JP | 2011-060306 A | 3/2011 |
| JP | 2012-043445 A | 3/2012 |

* cited by examiner

SERVER TABLE

| 401 SERVER NAME | 402 PROCESSOR | 403 MEMORY | 404 STORAGE DEVICE | 405 READ ERROR COUNT | 406 OS | 407 STORAGE SYSTEM | 408 WWN | 409 LU | 410 BIOS INFORMATION |
|---|---|---|---|---|---|---|---|---|---|
| SERVER A | Type1, 2.8GHz | 2048MB | SATA1, 1TB | 120 | OS1 | STORAGE1 | WWN1 | 1TB | FILE A |
| SERVER B | Type1, 3GHz | 4096MB | SATA1, 2TB | 243 | OS1 | STORAGE1 | WWN2 | 4TB | FILE B |
| SERVER C | Type1, 3.2GHz | 2048MB | SATA1, 1TB | 121 | OS2 | STORAGE2 | WWN3 | 2TB | FILE C |
| SERVER D | Type1, 3.2GHz | 2048MB | SATA1, 1TB | 408 | OS1 | STORAGE2 | WWN4 | 2TB | FILE D |
| SERVER E | Type1, 3.2GHz | 4096MB | SATA1, 1TB | 56 | OS1 | STORAGE1 | WWN5 | 1TB | FILE E |
| SERVER X | Type1, 3GHz | 4096MB | SATA1, 4TB | 0 | - | STORAGE1 | WWN6 | - | - |
| SERVER Y | Type1, 3.2GHz | 8192MB | SATA1, 2TB | 0 | - | STORAGE2 | WWN7 | - | - |
| SERVER Z | Type1, 3.2GHz | 8192MB | SATA1, 2TB | 0 | - | STORAGE2 | WWN8 | - | - |

FIG. 4

COLD STANDBY GROUP TABLE

| COLD STANDBY GROUP NAME (501) | ACTIVE SERVER NAME (502) | AUXILIARY SERVER NAME (503) |
|---|---|---|
| GROUP1 | SERVER A<br>SERVER B<br>SERVER C<br>SERVER D<br>SERVER E | SERVER X<br>SERVER Y<br>SERVER Z |

RESTORATION PAIR TABLE 241

| RESTORATION PAIR NAME 601 | COLD STANDBY GROUP NAME 602 | AUXILIARY SERVER NAME 603 | ACTIVE SERVER NAME 604 | PRIORITY ORDER 605 | COMMON IMAGE NAME 606 | RESTORATION FLAG 607 |
|---|---|---|---|---|---|---|
| RESTORATION PAIR 1 | GROUP 1 | SERVER X | SERVER A | 1 | DEPLOYMENT IMAGE 1 | UNRESTORED |
|  |  |  | SERVER D | 3 |  |  |
| RESTORATION PAIR 2 | GROUP 1 | SERVER Y | SERVER B | 2 | SERVER B IMAGE | UNRESTORED |
|  |  |  | SERVER E | 4 |  |  |
| RESTORATION PAIR 3 | GROUP 1 | SERVER Z | SERVER C | 1 | DEPLOYMENT IMAGE 2 | UNRESTORED |

FIG. 6

FULL BACKUP IMAGE CONFIGURATION TABLE 242

| FULL BACKUP IMAGE NAME 701 | ACTIVE SERVER NAME 702 | MBR IMAGE NAME 703 | FILE SET NAME 704 | TIMESTAMP 705 |
|---|---|---|---|---|
| DEPLOYMENT IMAGE 1 | SERVER A, SERVER D | MBR IMAGE 1 | (PARTITION 1) FILE SET 1-1, (PARTITION 1) FILE SET 1-2, ... | 2012/xx/xx xx:xx:xx |
| DEPLOYMENT IMAGE 2 | SERVER C | MBR IMAGE 1 | (PARTITION 1) FILE SET 2-1 | 2012/xx/xx xx:xx:xx |
| SERVER A IMAGE | SERVER A | MBR IMAGE A | (PARTITION 1) FILE SET A-1, | 2012/xx/xx xx:xx:xx |
| SERVER B IMAGE | SERVER B | MBR IMAGE B | (PARTITION 1) FILE SET B-1, | 2012/xx/xx xx:xx:xx |
| SERVER C IMAGE | SERVER C | MBR IMAGE C | (PARTITION 1) FILE SET C-1, | 2012/xx/xx xx:xx:xx |
| SERVER D IMAGE | SERVER D | MBR IMAGE D | (PARTITION 1) FILE SET D-1, | 2012/xx/xx xx:xx:xx |
| SERVER E IMAGE | SERVER E | MBR IMAGE E | (PARTITION 1) FILE SET E-1, | 2012/xx/xx xx:xx:xx |

FIG. 7

INDIVIDUAL IMAGE CONFIGURATION TABLE

| INDIVIDUAL IMAGE NAME (801) | MBR IMAGE NAME (802) | FILE SET NAME (ADDED · UPDATED) (803) | FILE SET NAME (DELETED) (804) | TIMESTAMP (805) |
|---|---|---|---|---|
| INDIVIDUAL IMAGE 1-A | MBR IMAGE1-A | (PARTITION 1) FILE SET1-A-2, (PARTITION 2) FILE SET 1-A-4, ... | (PARTITION 1) FILE SET1-A-3, ... | 2012/xx/xx xx:xx:xx |
| INDIVIDUAL IMAGE 1-D | MBR IMAGE1-D | (PARTITION 1) FILE SET 1-D-3 | (PARTITION 1) FILE SET1-D2-4 | 2012/xx/xx xx:xx:xx |

BACKUP DATA TABLE

| ACTIVE SERVER NAME (901) | COMMON IMAGE NAME (902) | INDIVIDUAL IMAGE NAME (903) | DIFFERENTIAL INFORMATION NAME (904) | TIMESTAMP (905) |
|---|---|---|---|---|
| SERVER A | DEPLOYMENT IMAGE 1 | INDIVIDUAL IMAGE 1-A | - | - |
| SERVER D | DEPLOYMENT IMAGE 2 | INDIVIDUAL IMAGE 1-D | - | - |

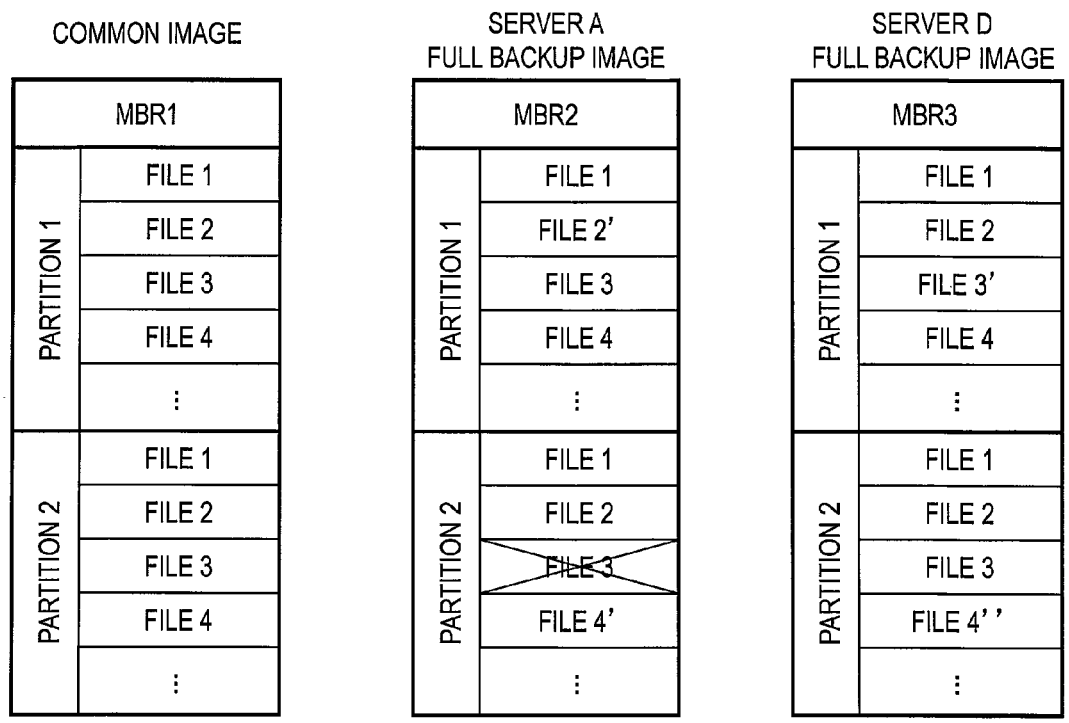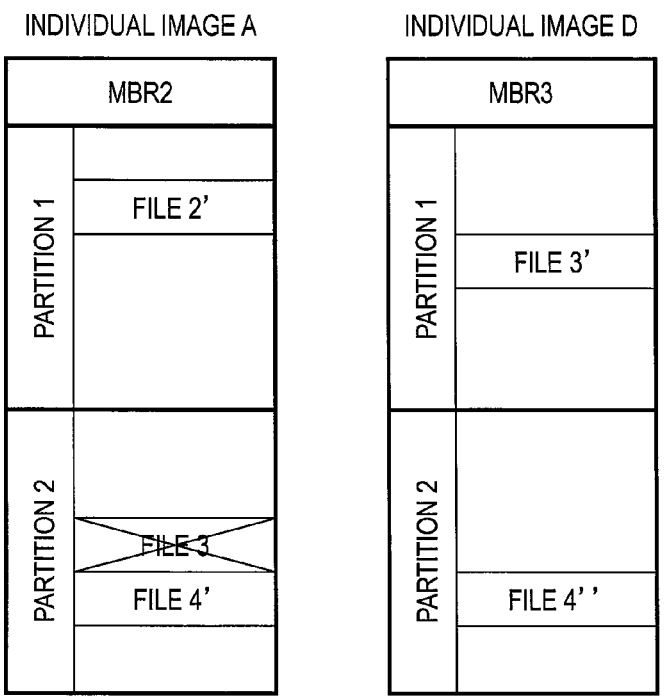
FIG. 12

BACKUP DATA TABLE

| ACTIVE SERVER NAME | COMMON IMAGE NAME | INDIVIDUAL IMAGE NAME | DIFFERENTIAL INFORMATION NAME | GENERATED TIME |
|---|---|---|---|---|
| SERVER A | DEPLOYMENT IMAGE 1 | INDIVIDUAL IMAGE 1-A | DIFFERENTIAL FILE A-1 | 2012/xx/xx xx:xx:xx |
| | | | DIFFERENTIAL FILE A-2 | 2012/xx/xx xx:xx:xx |
| | | | ... | ... |
| SERVER D | DEPLOYMENT IMAGE 2 | INDIVIDUAL IMAGE 1-D | DIFFERENTIAL FILE B-1 | 2012/xx/xx xx:xx:xx |
| | | | DIFFERENTIAL FILE B-2 | 2012/xx/xx xx:xx:xx |
| | | | ... | ... |

FIG. 13

RESTORATION PAIR TABLE 241

| RESTORATION PAIR NAME 601 | COLD STANDBY GROUP NAME 602 | AUXILIARY SERVER NAME 603 | ACTIVE SERVER NAME 604 | PRIORITY ORDER 605 | COMMON IMAGE NAME 606 | RESTORATION FLAG 607 |
|---|---|---|---|---|---|---|
| RESTORATION PAIR 1 | GROUP1 | SERVER X | SERVER A | 1 | DEPLOYMENT IMAGE 1 | RESTORED |
| | | | SERVER D | 3 | | |
| RESTORATION PAIR 2 | GROUP1 | SERVER Y | SERVER B | 2 | SERVER B IMAGE | RESTORED |
| | | | SERVER E | 4 | | |
| RESTORATION PAIR 3 | GROUP1 | SERVER Z | SERVER C | 1 | DEPLOYMENT IMAGE 2 | RESTORED |

FIG. 17

COMPUTER SYSTEM, CLUSTER MANAGEMENT METHOD, AND MANAGEMENT COMPUTER

CLAIM OF PRIORITY

The present application claims priority from Japanese patent application PCT/JP2012/080326 filed on Nov. 22, 2012, the content of which is hereby incorporated by reference into this application.

BACKGROUND OF THE INVENTION

This invention relates to a system, a method, and a computer that accomplish quick switching between computers in the event of a failure in a computer system where clusters are built.

A cluster system which includes an active server for executing a service and an auxiliary server which takes over the service in the event of a failure is used to secure the availability of a computer system. Cold standby systems are known as one of cluster systems of this type.

A cluster system stores data necessary for the execution of a service in at least one of an external storage system and an internal storage device which is provided in a server.

In the case where the data is stored in the storage system, the active server and the auxiliary server are both coupled to the same storage system via a storage area network (SAN). Normally, a communication path is established between the active server and the storage system, and the active server uses the data stored in the storage system to execute the service.

Cluster systems that use a storage system are employed in systems that place importance on reliability, and cluster systems that use an internal storage device are employed in systems that place importance on price.

In the event of a failure in the active server, the two methods described above switch from the active server to the auxiliary server as follows.

A cluster system that uses a storage system switches from a communication path between the active server and the storage system to a communication path between the auxiliary server and the storage system. A cluster system that uses an internal storage device obtains backup data of data stored in the internal storage device of the active server, and restores the backup data to the internal storage device of the auxiliary server.

The switch from the active server to the auxiliary server is made by various known methods (see, for example, Japanese Patent Application Laid-open No. 2009-129148).

SUMMARY OF THE INVENTION

In the invention of Japanese Patent Application Laid-open No. 2009-129148, a management server distributes in advance a disk image that is a copy of a service provided by the failed active server to the auxiliary server. This cuts short the time required to complete failover.

However, in the case where the service of the disk image distributed to the auxiliary server differs from the service of the failed active server, a disk image of the active server needs to be distributed anew in Japanese Patent Application Laid-open No. 2009-129148. The time required to complete failover is therefore not always cut short successfully. In addition, the disk image distributed to the auxiliary server differs from the state that the active server is in at the time of the failure, and the service state of the active server prior to the failure cannot be restored. In short, Japanese Patent Application Laid-open No. 2009-129148 has a problem in that the disk image distributed to the auxiliary server becomes obsolete.

An object of this invention is to solve the problems described above. Specifically, it is an object of this invention to provide a system and a method that are capable of distributing an appropriate disk image to an auxiliary server in advance and restoring the service state of an active server prior to a failure.

The present invention can be appreciated by the description which follows in conjunction with the following figures, wherein: a computer system, comprising a plurality of computers, and a management computer for managing a cluster which includes the plurality of computers. Each of the plurality of computers has a first processor, a first memory coupled to the first processor, a storage device coupled to the first processor, and a first network interface coupled to the first processor. The management computer has a second processor, a second memory coupled to the second processor, and a second network interface coupled to the second processor. The plurality of computers constituting the cluster include a plurality of first computers each of which uses the storage device to execute a service and a plurality of second computers for taking over the service that is executed by one of the plurality of first computers that has failed. The management computer includes a backup obtaining module for obtaining a backup image from each of the plurality of first computers; and a restoration pair management module for generating a plurality of restoration pairs each of which is constituted of at least one first computer and at least one second computer, and selecting, for each of the plurality of restoration pairs, a common image to be restored to the at least one second computer included in the restoration pair. The management computer holds server management information for managing hardware configuration information and software configuration information for each of the plurality of computers constituting the cluster. The restoration pair management module is configured to refer to the server management information and sort the plurality of first computers into a plurality of groups of first computers by which a software configuration for providing the service is common, in a case where a change in the configuration of the cluster is detected, refer to the server management information and allocate at least one second computer to each of the plurality of groups based on the hardware configuration information of each of the plurality of first computers and the hardware configuration information of each of the plurality of second computers, generate at least one restoration pair for each of the plurality of groups by associating at least one first computer that is included in one group with at least one second computer that is allocated to the one group, determine the common image for each of the plurality of restoration pairs out of the backup image of the at least one first computer included in the restoration pair, and generate a piece of restoration pair management information that associates identification information of the restoration pair, identification information of the at least one first computer included in the restoration pair, identification information of the at least one second computer included in the restoration pair, and identification information of the common image of the restoration pair with one another.

According to this invention, where a software configuration for providing a service is common to the plurality of first computers in a restoration pair, there is no need to distribute anew a backup image to the auxiliary server. The common software configuration also reduces the difference between a common image and a backup image of each of the first computers included in the restoration pair. Consequently, an appropriate backup image can be distributed to the second computer and quick switching to the second computer is accomplished.

Other objects, configurations, and effects than those described above are clarified in the following description of embodiments.

BRIEF DESCRIPTION OF THE DRAWINGS

The present invention can be appreciated by the description which follows in conjunction with the following figures, wherein:

FIG. 4 is an explanatory diagram illustrating an example of a server table in the first embodiment of this invention;

FIG. 5 is an explanatory diagram illustrating an example of a cold standby group table in the first embodiment of this invention;

FIG. 6 is an explanatory diagram illustrating an example of a restoration pair table in the first embodiment of this invention;

FIG. 7 is an explanatory diagram illustrating an example of a full backup image configuration table in the first embodiment of this invention;

FIG. 8 is an explanatory diagram illustrating an example of an individual image configuration table in the first embodiment of this invention;

FIG. 9 is an explanatory diagram illustrating an example of a backup data table in the first embodiment of this invention;

FIG. 12 is an explanatory diagram illustrating a backup image in the first embodiment of this invention;

FIG. 13 is an explanatory diagram illustrating an example of the backup table in the first embodiment of this invention;

FIG. 17 is an explanatory diagram illustrating an example of the restoration pair table in the first embodiment of this invention;

DETAILED DESCRIPTION OF THE PREFERRED EMBODIMENTS

Embodiments of this invention are described below with reference to the accompanying drawings.

First Embodiment

Figure 1:
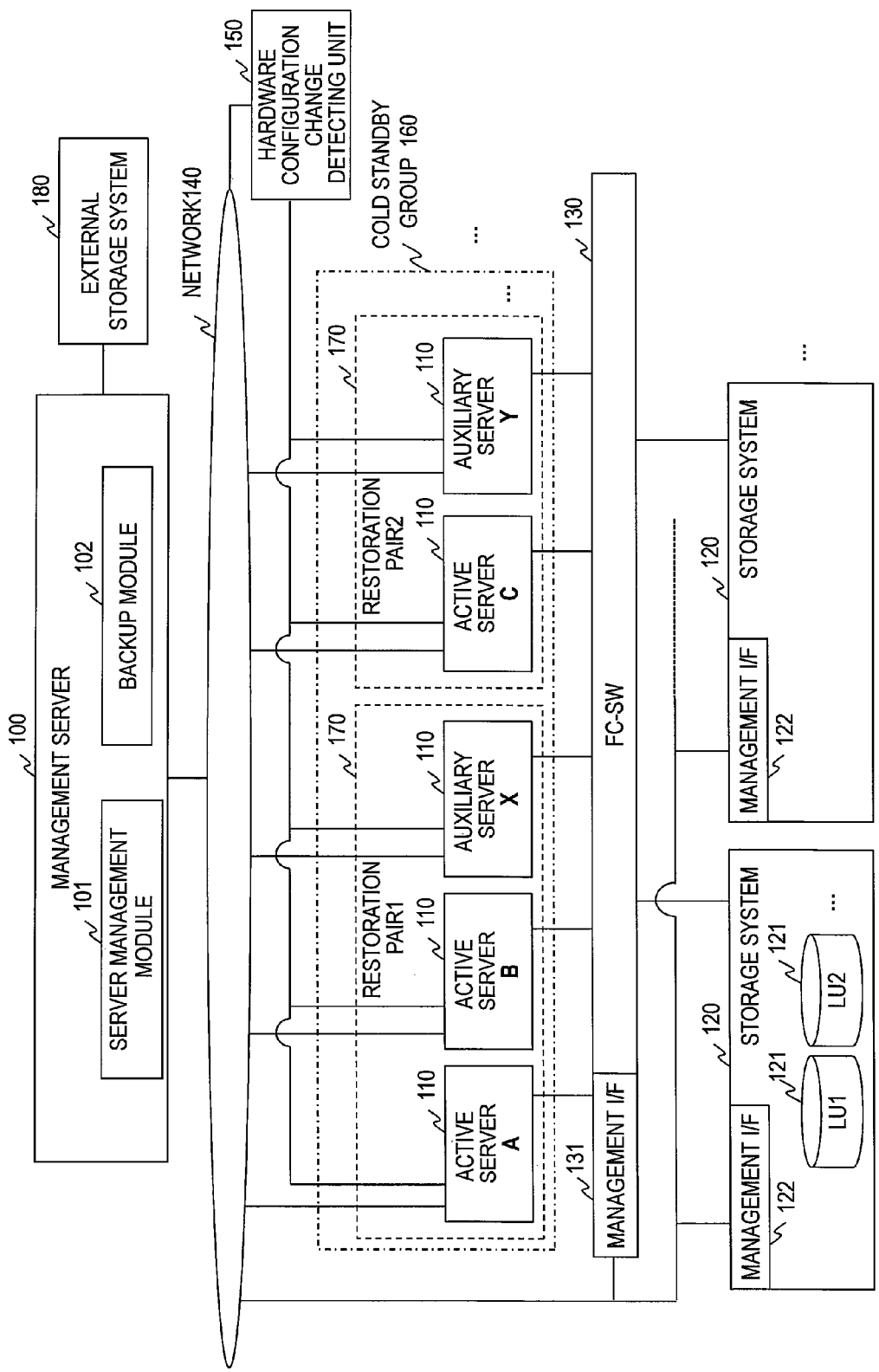
FIG. 1 is a block diagram illustrating a configuration of a computer system according to a first embodiment of this invention.

FIG. 1 is a block diagram illustrating the configuration of a computer system according to a first embodiment of this invention.

The computer system of this embodiment includes a management server 100, a plurality of servers 110, a plurality of storage systems 120, an external storage system 180, a fiber channel switch (FC-SW) 130, and a hardware configuration change detecting unit 150.

The management server 100 is coupled to the plurality of servers 110, the plurality of storage systems 120, and the hardware configuration change detecting unit 150 via a network 140. The management server 100 is also coupled to the external storage system 180 via a network, or directly connected to the external storage system 180.

The hardware configuration change detecting unit 150 is connected to the plurality of servers 110. The plurality of servers 110 are coupled to the plurality of storage systems 120 via a SAN that is constituted of the FC-SW 130.

This invention is not limited by the coupling format of the network 140, and a wide area network (WAN) or a local area network (LAN) may be employed. The hardware configuration change detecting unit 150 may be coupled to the plurality of servers 110 via a network, or directly connected to the plurality of servers 110.

The servers 110 are computers for executing services. The servers 110 in this embodiment include active servers 110 which actually execute services and auxiliary servers 110 which take over the services in a case where a failure occurs in the active servers 110.

The active servers 110 each execute a given service by using at least one of an internal storage device 305 (see FIG. 3) and a logical unit (LU) 121. Each active server 110 in this embodiment uses the internal storage device 305 (see FIG. 3) and the LU 121 both to execute a service.

This invention has the same effects also in a case where each active server 110 uses only the internal storage device 305 (see FIG. 3) to execute a service.

The hardware configuration and software configuration of the servers 110 are described later with reference to FIG. 3. The active servers 110 and the auxiliary servers 110 have the same hardware configuration.

The computer system assumed in this embodiment is one in which cold standby clusters are built. Specifically, a cold standby group 160 is configured from the plurality of servers 110. A service is taken over between the servers 110 that are included in the cold standby group 160. Of the servers 110 that are included in the cold standby group 160, the auxiliary servers 110 are powered off.

A feature of this embodiment resides in that a plurality of restoration pairs 170 are generated within each cold standby group 160 as described later.

Each restoration pair 170 is a group constituted of one or more active servers 110 and one or more auxiliary servers 110. The restoration pairs 170 are generated in order to accomplish efficient obtainment of a backup image and quick restoration of a backup image. How the restoration pairs 170 are generated is described later.

In the event of a failure in the active server 110 that is included in one of the restoration pairs 170, the auxiliary server 110 that is included in the same restoration pair 170 takes over the failed server's service.

In the example of FIG. 1, a restoration pair 1 which is constituted of an active server A, an active server B, and an auxiliary server X and a restoration pair 2 which is constituted of an active server C and an auxiliary server Y are generated.

The hardware configuration change detecting unit 150 detects a change in the hardware configuration of the servers 110. The hardware configuration change detecting unit 150 in this embodiment is described as one device, but this invention is not limited thereto. For instance, the management server 100, the servers 110, or the storage systems 120 may include the hardware configuration change detecting unit 150 as a program module.

The management server 100 manages the entire computer system in which cold standby clusters are built. Specifically, the management server 100 generates the restoration pairs 170 and obtains, for each restoration pair 170, a backup image of the pair's active server 110. The management server 100 also monitors the behavior of the active servers 110 and, if a failure is detected in one of the active servers 110, switches to its paired auxiliary server 110.

The management server 100 in this embodiment includes a server management module 101 and a backup module 102 in order to implement the control described above.

The server management module 101 manages information of the servers 110 and information of clusters. The backup module 102 obtains a backup image necessary for the taking over of a service. The backup module 102 also generates the restoration pairs 170 in order to obtain optimum backup images.

The server management module 101 and the backup module 102 execute server switching processing in cooperation with one another in a case where a failure is detected in one of the active servers 110. In the server switching processing, the backup module 102 executes processing of restoring a backup image to the relevant auxiliary server 110.

The hardware configuration and software configuration of the management server 100 are described later with reference to FIG. 2.

The storage systems 120 provide storage areas allocated to the active servers 110. The storage systems 120 each include a disk controller (not shown), a plurality of storage devices (not shown), and a disk interface (not shown). Each storage system 120 also has a management interface 122 for coupling to the management server 100.

Each storage system 120 in this embodiment generates the LUs 121 from storage areas of the plurality of storage devices and provides the LUs 121 to the active servers 110. The LUs 121 store programs such as an operating system (OS) and an application, and various types of information necessary to execute the programs. The storage devices can be hard disk drives (HDDs) or solid state drives (SSDs). Each storage system 130 may construct a RAID from the plurality of storage devices.

The external storage system 180 stores a program and information that are necessary for the management server 100 to execute processing. The external storage system 180 in this embodiment stores backup images of the active servers 110. The external storage system 180 has the same configuration as that of the storage systems 120. The external storage system 180 may use tape as a storage device.

The FC-SW 130 constitutes a SAN for coupling the plurality of servers 110 and the plurality of storage systems 120. While one FC-SW 130 constitutes the SAN in FIG. 1, the SAN may instead be constituted of a plurality of FC-SWs 130.

The type of the management server 100 and the servers 110 can be any one of a physical server, blade server, virtualized server, and server created by logical/physical partition or physical partition. Effects of this invention can be obtained regardless of the type of the management server 100 and the servers 110.

Figure 2:
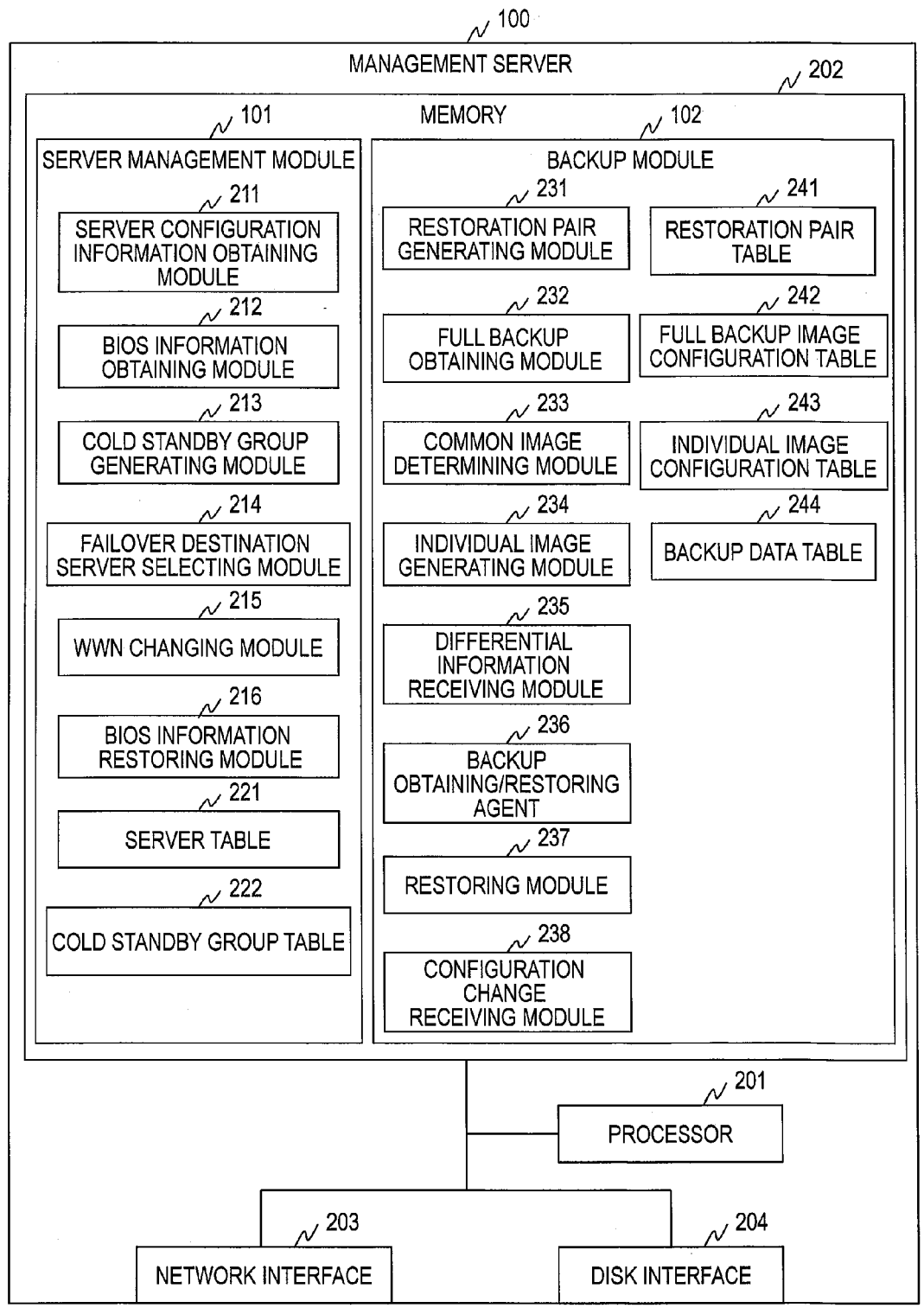
FIG. 2 is a block diagram illustrating a hardware configuration and software configuration of a management server according to the first embodiment of this invention.

FIG. 2 is a block diagram illustrating the hardware configuration and software configuration of the management server 100 according to the first embodiment of this invention.

The management server 100 includes a processor 201, a memory 202, a network interface 203, and a disk interface 204. The management server 100 may also include an input device such as a keyboard and a mouse and an output device such as a display.

The processor 201 includes one or more arithmetic devices and executes a program stored in the memory 202. Functions of the management server 100 are implemented by the processor 201 by executing programs. A description having a program as the subject hereinafter implies that the program is executed by the processor 201.

The memory 202 stores a program executed by the processor 201 and information necessary for the execution of the program. What program and information are stored in the memory 202 is described later.

The network interface 203 is an interface for communication to/from other devices over an IP network. The disk interface 204 is an interface for accessing the storage systems 120 and others.

FIG. 2 illustrates one network interface 203 and one disk interface 204 as representatives, and the management server 100 may have a plurality of network interfaces 203 and a plurality of disk interfaces 204.

For instance, in the case where the management server 100 has two network interfaces 203, the management server 100 may couple to a management-use network via one of the network interfaces 203 and to a service-use network via the other network interface 203.

Programs and information stored in the memory 202 are described next.

The memory 202 stores programs and management tables that implement the server management module 101 and the backup module 102. The memory 202 may additionally store programs and information that are not shown here. The server management module 101 is described first.

The server management module 101 manages the hardware configuration and software configuration of the plurality of servers 110. The server management module 101 is constituted of a plurality of program modules and a plurality of tables.

Specifically, the server management module 101 includes a server configuration information obtaining module 211, a BIOS information obtaining module 212, a cold standby group generating module 213, a failover destination server selecting module 214, a WWN changing module 215, a BIOS information restoring module 216, a server table 221, and a cold standby group table 222.

The server configuration information obtaining module 211 obtains, via the network 140, from the plurality of servers that are included in the cold standby groups 160, performance information of the servers 110 such as hardware configuration and software configuration.

The server configuration information obtaining module 211 may, for example, transmit an information collecting agent to each of the servers 110 to collect performance information of the servers 110 from the agent. The server configuration information obtaining module 211 may instead obtain performance information of the servers 110 by making an inquiry to the OSs that run on the active servers 110. These methods of obtaining performance information of the servers 110 are given as examples, and this invention is not limited thereto.

The BIOS information obtaining module 212 obtains BIOS information via the network 140 from the plurality of active servers 110 that are included in the cold standby groups 160. BIOS information includes BIOS settings, boot order, and the like in the active servers 110.

The BIOS information obtaining module 212 may obtain BIOS information by, for example, making an inquiry to OSs that run on the active servers 110. This method of obtaining BIOS information is given as an example, and this invention is not limited thereto.

The cold standby group generating module 213 generates the cold standby groups 160 following an instruction from an administrator or a user.

In a case where a failure is detected in one of the active servers 110 that are included in one of the cold standby groups 160, the failover destination server selecting module 214 selects the auxiliary server 110 that is to take over the service of the failed active server 110, namely, the auxiliary server 110 that serves as a failover destination.

The WWN changing module 215 switches coupling between the storage systems 120 which provide storage areas for storing information necessary for services and the servers 110. In other words, the WWN changing module 215 switches from coupling between an LU and the active server 110 where a failure has occurred to coupling between the LU and one of the auxiliary servers 110.

Specifically, the WWN changing module 215 switches World Wide Names (WWNs) that the servers 110 use for fiber channel communication to/from the LUs 121. A WWN is a unique device identifier. In the case where the servers 110 and the storage systems 120 are coupled via an IP-SAN or the like, identifiers equivalent to WWN, such as iSCSI Qualified Name, are changed.

The BIOS information restoring module 216 restores BIOS information obtained by the BIOS information obtaining module 212 to the auxiliary server 110 that is a failover destination.

The server table 221 stores information about the configurations of the plurality of servers 110. Specifically, the server table 221 stores the configuration information of the servers 110 which is obtained by the server configuration information obtaining module 211 and BIOS information obtained by the BIOS information obtaining module 212. Details of the server table 221 are described later with reference to FIG. 4.

The cold standby group table 222 stores information about the configurations of the cold standby groups 160. Specifically, the cold standby group table 222 stores information about the cold standby groups 160 generated by the cold standby group generating module 213. Details of the cold standby group table 222 are described later with reference to FIG. 5.

The backup module 102 is described next.

The backup module 102 obtains backup images of the active servers 110 that are included in the cold standby groups 160, and sets various settings for recovery from a failure. The backup module 102 is constituted of a plurality of program modules and a plurality of tables.

Specifically, the backup module 102 includes a restoration pair generating module 231, a full backup obtaining module 232, a common image determining module 233, an individual image generating module 234, a differential information receiving module 235, a backup obtaining/restoring agent 236, a restoring module 237, a configuration change receiving module 238, a restoration pair table 241, a full backup image configuration table 242, an individual image configuration table 243, and a backup data table 244.

The restoration pair generating module 231 generates the restoration pairs 170 based on performance information and the like of the servers 110.

The full backup obtaining module 232 obtains full backup images of the active servers 110.

The common image determining module 233 determines a common image to be restored to the auxiliary servers 110 included in the restoration pair 170 of interest. A common image here means a full backup image of an arbitrary active server 110 that is included in the restoration pair 170.

The individual image generating module 234 generates an individual image, which is differential data between a common image and the full backup image of each server 110.

The differential information receiving module 235 obtains differential information about updated data out of data stored in the internal storage device 305 (see FIG. 3) after a full backup image is obtained. As described later, differential information is obtained by a differential information obtaining module 311 (see FIG. 3) which runs on each active server 110.

The backup obtaining/restoring agent 236 obtains full backup images from the active servers 110, and restores full backup images, individual images, and differential information to the auxiliary servers 110.

The backup image obtaining/restoring agent 236 is deployed onto the active servers 110 in a case where full backup images are obtained and deployed onto the auxiliary servers 110 in a case where backup images are restored. The backup obtaining/restoring agent 236 may be installed in the active servers 110. For instance, the backup obtaining/restoring agent 236 may be stored in advance in the internal storage device 305 (see FIG. 3) of each active server 110, or in the LUs 121 that the active servers 110 use.

The restoring module 237 restores backup images, individual images, and differential information that are necessary for the taking over of services to the auxiliary servers 110.

The configuration change receiving module 238 receives a message to the effect that there has been a change in hardware configuration and software configuration within the computer system. A hardware configuration change can be an addition or deletion of the servers 110. A change in the OSs of the active servers 110, an upgrade of the OSs, and an addition or deletion of an application can be counted as software configuration changes.

The restoration pair table 241 stores information for managing the restoration pairs 170 which are generated by the restoration pair generating module 231. Details of the restoration pair table 241 are described later with reference to FIG. 6.

The full backup image configuration table 242 stores information for managing full backup images of the active servers 110 that have been obtained since service systems have started running. Details of the full backup image configuration table 242 are described later with reference to FIG. 7.

The individual image configuration table 243 stores information for managing individual images. Details of the individual image configuration table 243 are described later with reference to FIG. 8.

The backup data table 244 stores information for managing the latest backup images in the active servers 110. Details of the backup data table 244 are described later with reference to FIG. 9.

The respective functions of the plurality of program modules may be integrated to be implemented as one program module, and a plurality of functions of one program module may be implemented separately as a plurality of program modules.

For instance, the management server 100 may have a restoration pair management module whose functions include ones implemented by the restoration pair generating module 231, the common image determining module 233, and the individual image generating module 234. The management server 100 may also have, in place of the restoring module 237, a common image restoring module, which restores a common image, an individual image restoring module, which restores a common image, and a differential information restoring module, which restores differential information.

Figure 3:
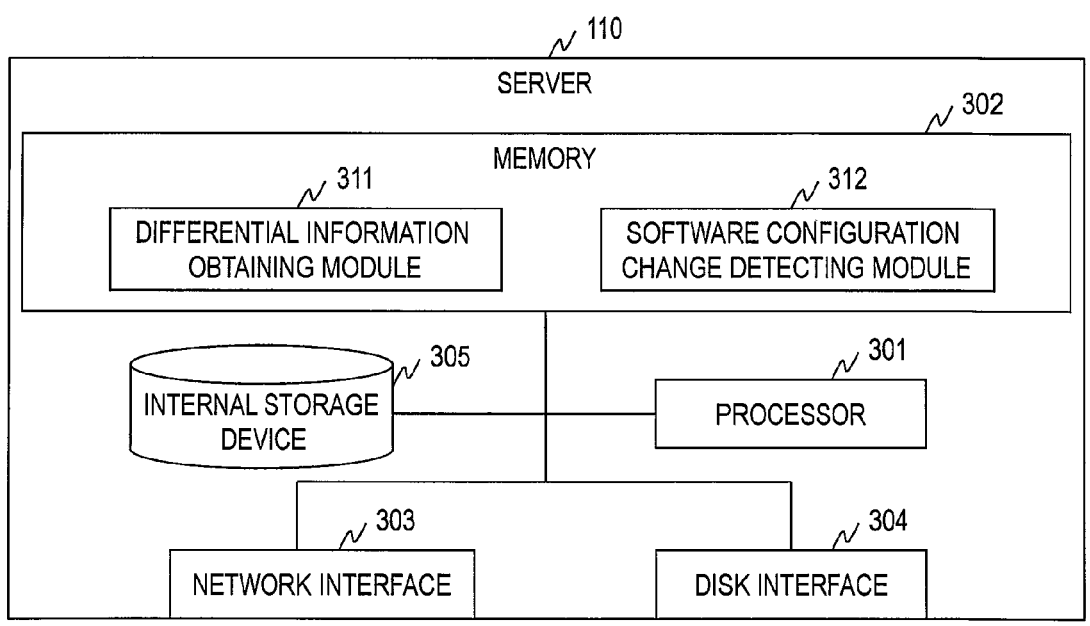
FIG. 3 is a block diagram illustrating the hardware configuration and software configuration of servers according to the first embodiment of this invention.

FIG. 3 is a block diagram illustrating the hardware configuration and software configuration of the servers 110 according to the first embodiment of this invention.

Each server 110 includes a processor 301, a memory 302, a network interface 303, and a disk interface. The server 110 may also include an input device such as a keyboard and a mouse and an output device such as a display.

The processor 301 includes one or more arithmetic devices and executes a program stored in the memory 302. Functions of the server 110 are implemented by the processor 301 by executing programs. A description having a program as the subject hereinafter implies that the program is executed by the processor 301.

The memory 302 stores a program executed by the processor 301 and information necessary for the execution of the program. What program and information are stored in the memory 302 is described later.

The network interface 303 is an interface for communication to/from other devices over an IP network. A disk interface 304 is an interface for accessing the storage systems 120 and others.

FIG. 3 illustrates one network interface 303 and one disk interface 304 as representatives, and the management server 100 may have a plurality of network interfaces 303 and a plurality of disk interfaces 304.

For instance, in the case where the server 110 has two network interfaces 303, the server 110 may couple to a management-use network via one of the network interfaces 303 and to a service-use network via the other network interface 303.

The internal storage device 305 stores information necessary for the execution of a service, for example, programs that implement an OS and an application. The storage area of the internal storage device 305 includes a file area for storing one or more partitions and an area for storing the master boot record (MBR), which manages partition information and the configuration of the internal storage device 305. Each partition stores a plurality of files. A plurality of files may hereinafter also be referred to as "file set".

The memory 302 of each active server 110 stores programs for implementing the differential information obtaining module 311 and a software configuration change detecting module 312. Though not shown, the memory 302 stores an OS and an application as well. These programs are not loaded onto the memory 302 of the auxiliary servers 110 which are powered off.

The differential information obtaining module 311 monitors the state of a file stored in the internal storage device 305 and, in a case where the monitored data is updated, notifies the management server 100 of the update of the file. The notification includes identification information of the updated file and the contents of the updated file as information about the updated file.

The software configuration change detecting module 312 monitors the configuration of a program in the active server 110 and, in a case where a change is found in the configuration of the program, notifies the management server 100 of the change to the program configuration. The configuration of a program is changed in a case where, for example, a new application is added, the OS is upgraded, and the OS type is changed.

The configurations of the tables provided in the management server 100 are described next.

FIG. 4 is an explanatory diagram illustrating an example of the server table 221 in the first embodiment of this invention.

The server table 221 stores performance information and BIOS information of the servers 110 included in the computer system. Specifically, the server table 221 includes a server name 401, a processor 402, a memory 403, a storage device 404, a read error count 405, an OS 406, a storage system 407, a WWN 408, an LU 409, and BIOS information 410.

Performance information of the servers 110 which is obtained by the server configuration information obtaining module 211 is stored as the processor 402, the memory 403, the storage device 404, the read error count 405, the OS 406, the storage system 407, the WWN 408, and the LU 409. BIOS information obtained by the BIOS information obtaining module 212 is stored as the BIOS information 410.

Identification information for identifying each server 110 uniquely is stored as the server name 401. In this embodiment, the names of the servers 110 are used as identification information of the servers 110. This invention is not limited thereto and can use any type of information by which each server 110 is identified uniquely throughout the computer system.

Stored for each server 110 as the processor 402 is performance information of the processor 301 that the server 110 has. Performance information of the processor 301 can be the type, clock count, core count, or the like of the processor 301. The type of the processor 301 here means the product name, architecture name, or the like of the processor 301.

Stored for each server 110 as the memory 403 is performance information of the memory 302 that the server 110 has. Memory performance information can be the standard, capacity, latency, or the like of the memory 302.

Stored for each server 110 as the storage device 404 is performance information of the internal storage device 305 that the server 110 has. Performance information of the internal storage device 305 can be the version, read rate, write rate, capacity, or the like of the storage device.

Stored as the read error count 405 is the count of errors that have occurred during data read in the internal storage device 305. At the time a service system is built, "0" is stored as the initial value of the read error count 405.

Stored for each active server 110 as the OS 406 is information about the type of the OS running on the active server 110. The OSs on the auxiliary servers 110 are not running and the field for the OS 406 is therefore empty in entries for the auxiliary servers 110.

Stored for each active server 110 which executes a service as the storage system 407 is identification information for uniquely identifying the storage system 120 that is coupled to the active server 110. In this embodiment, the names of the storage systems 120 are used as identification information of the storage systems 120. This invention is not limited thereto and can use any type of information by which each storage system 120 is identified uniquely throughout the computer system. Stored as the WWN 408 are WWNs that are used for coupling to the storage systems 120.

The auxiliary servers 110 are coupled to the storage systems 407 in advance to take over services of the active servers 110 in the event of a failure. Given information is therefore stored as the storage system 407 and the WWN 408 in entries for the auxiliary servers 110.

Stored for each active server 110 as the LU 409 is performance information of the LU 121 that is allocated to the active server 110. Performance information of the LUs 121 can be the capacity or the like of the LUs 121. The auxiliary servers 110 are not allocated the LUs 121. In other words, coupling to the LUs 121 is not enabled. The field for the LU 409 therefore is empty in entries for the auxiliary servers 110.

Stored for each server 110 as the BIOS information 410 is identification information of a file that stores BIOS information of the server 110. BIOS information is information including BIOS settings, boot order, and the like. BIOS information is information necessary to boot the auxiliary server 110 that takes over a service.

Performance information of the servers 110 is not limited to ones described above, and may include the performance of the network interface 303, the type of applications executed on the servers 110, and the like. In the case of a computer system that uses virtual machines as the active servers 110 and the auxiliary servers 110, the type, version, and the like of a program for implementing a virtualizing module which manages the virtual machines may be included in performance information of the servers 110.

FIG. 5 is an explanatory diagram illustrating an example of the cold standby group table 222 in the first embodiment of this invention.

The cold standby group table 222 stores information about the configurations of the cold standby groups 160. Specifically, the cold standby group table 222 includes a cold standby group table name 501, an active server name 502, and an auxiliary server name 503.

Identification information for identifying each cold standby group 160 uniquely is stored as the cold standby group name 501. The identification information of the cold standby groups 160 used in this embodiment is the name of the cold standby group 160. This invention is not limited thereto and can use any type of information by which each cold standby group 160 is identified uniquely.

Stored for each cold standby group 160 as the active server name 502 is identification information for uniquely identifying each active server 110 that is included in the cold standby group 160. Stored for each cold standby group 160 as the auxiliary server name 503 is identification information for uniquely identifying each auxiliary server 110 that is included in the cold standby group 160. The same information as the server name 401 is used for the active server name 502 and the auxiliary server name 503.

FIG. 6 is an explanatory diagram illustrating an example of the restoration pair table 241 in the first embodiment of this invention.

The restoration pair table 241 stores information about the configurations of the restoration pairs 170. Specifically, the restoration pair table 241 includes a restoration pair name 601, a cold standby group name 602, an auxiliary server name 603, an active server name 604, a priority order 605, a common image name 606, and a restoration flag 607.

Identification information for identifying each restoration pair 170 uniquely is stored as the restoration pair name 601. In this embodiment, the names of the restoration pairs 170 are used as identification information of the restoration pairs 170. This invention is not limited thereto and can use any type of information by which each restoration pair 170 is identified uniquely.

Stored for each restoration pair 170 as the cold standby group name 602 is identification information for uniquely identifying the cold standby group 160 in which the restoration pair is generated. The same information as the cold standby group name 501 is used for the cold standby group name 602.

Stored for each restoration pair 170 as the auxiliary server name 603 is identification information for uniquely identifying each auxiliary server 110 that is included in the restoration pair 170. Stored for each restoration pair 170 as the active server name 604 is identification information for uniquely identifying each active server 110 that is included in the restoration pair 170. The same information as the auxiliary server name 503 is used for the auxiliary server name 603, and the same information as the active server name 502 is used for the active server name 604.

A value used to determine a common image is stored as the priority order 605. In this embodiment, a smaller value of the priority order 605 indicates a higher place in priority order. A higher place in priority order, namely, a smaller value, is given in this embodiment to the active server 110 that has a higher possibility for failure.

Stored for each restoration pair 170 as the common image name 606 is identification information of a common image in the restoration pair 170. The name of a common image is used in this embodiment as identification information of the common image. This invention is not limited thereto and can use any type of information by which a common image is identified uniquely.

Stored as the restoration flag 607 is information that indicates whether or not the common image has been restored to the relevant auxiliary server 110. In this embodiment, "unrestored" is stored as the restoration flag 607 in the case where the common image has not been restored to the auxiliary server 110 and "restored" is stored as the restoration flag 607 in the case where the common image has been restored to the auxiliary server 110.

In the example of FIG. 6, one restoration pair 170 is constituted of one auxiliary server 110 and one or more active servers 110.

This invention is not limited thereto, and one restoration pair 170 may be constituted of a plurality of auxiliary servers 110 and a plurality of active servers 110. In this case, the number of auxiliary servers 110 that are included in one restoration pair 170 is desirably smaller than the number of active servers 110 that are included in the restoration pair 170. This is because preparing many auxiliary servers 110 in the computer system is costly and is not conducive to effective use of computer resources.

FIG. 7 is an explanatory diagram illustrating an example of the full backup image configuration table 242 in the first embodiment of this invention.

The full backup image configuration table 242 stores information about the configurations of full backup images obtained from the active servers 110. Specifically, the full backup image configuration table 242 includes a full backup image name 701, an active server name 702, an MBR image name 703, a file set name 704, and a timestamp 705.

Identification information for identifying full backup images obtained from the active servers 110 is stored as the full backup image name 701. The name of a full backup image is used in this embodiment as identification information of the full backup image. This invention is not limited thereto and can use any type of information by which a full backup image is identified.

Identification information for uniquely identifying the server 110 from which a full backup image has been obtained is stored as the active server name 702. The same information as the active server name 502 is used for the active server name 702.

Stored as the MBR image name 703 is identification information for uniquely identifying an image of an MBR which is contained in the storage area of the internal storage device 305. The name of an MBR image is used in this embodiment as identification information of the MBR image. This invention is not limited thereto and can use any type of information by which an MBR image is identified uniquely.

Identification information for identifying a file set which is stored in a partition is stored as the file set name 704. The name of a partition and the name of a file set are used in this embodiment as identification information of the file set. This invention is not limited thereto and can use any type of information by which a file set is identified.

The time of generation of a full backup image is stored as the timestamp 705.

In the case where full backup images have not been obtained at the time a service system is built, the full backup image configuration table 242 stores information about deployment images deployed onto the active servers 110, or information about images installed in the active servers 110. The fields for the MBR image name 703, the file set name 704, and the timestamp 705 in this case remain empty.

FIG. 8 is an explanatory diagram illustrating an example of an individual image configuration table 243 in the first embodiment of this invention.

The individual image configuration table 243 stores information about the configuration of an individual image which is differential data between a common image and a full backup image of each server 110. Specifically, the individual image configuration table 243 includes an individual image name 801, an MBR image name 802, file set names 803 and 804, and a timestamp 805.

Identification information for uniquely identifying an individual image is stored as the individual image name 801. The name of an individual image is used in this embodiment as identification information of the individual image. This invention is not limited thereto and can use any type of information by which an individual image is identified.

Stored as the MBR image name 802 is identification information for uniquely identifying an MBR image that is included in a full backup image of the server 110 of interest. The same information as the MBR image name 703 is used for the MBR image name 802.

Stored as the file set name 803 is identification information of a file set that is an addition or an update to a common image out of differential data between the common image and a full backup image of the server 110 of interest. Stored as the file set name 804 is identification information of a file that has been deleted from a common image out of differential data between the common image and a full backup image of the server 110 of interest. The same information as the file set name 704 is used for the file set name 803 and the file set name 804.

The time of generation of an individual image is stored as the timestamp 805.

FIG. 9 is an explanatory diagram illustrating an example of the backup data table 244 in the first embodiment of this invention.

The backup data table 244 stores information for managing the latest backup images of the active servers 110. Specifically, the backup data table 244 includes an active server name 901, a common image name 902, an individual image name 903, a differential information name 904, and a timestamp 905.

Identification information for identifying each active server 110 uniquely is stored as the active server name 901. The same information as the server name 401 is used for the active server name 901.

Stored as the common image name 902 is identification information for uniquely identifying a common image in the restoration pair 170 that includes the active server 110 identified by the active server name 901. The same information as the common image name 606 is used for the common image name 902.

Identification information for uniquely identifying an individual image that is generated for the active server 110 in question is stored as the individual image name 903. The same information as the individual image name 801 is used for the individual image name 903.

Stored as the differential information name 904 is identification information for uniquely identifying differential information that is data of the active server 110 in question updated between the obtainment of one full backup image and the obtainment of another full backup image. The name of a piece of differential information is used in this embodiment as identification information of the piece of differential information.

The time of generation of differential information is stored as the timestamp 905.

Concrete processing is described next. An outline of processing in this embodiment is given first.

Figure 10:
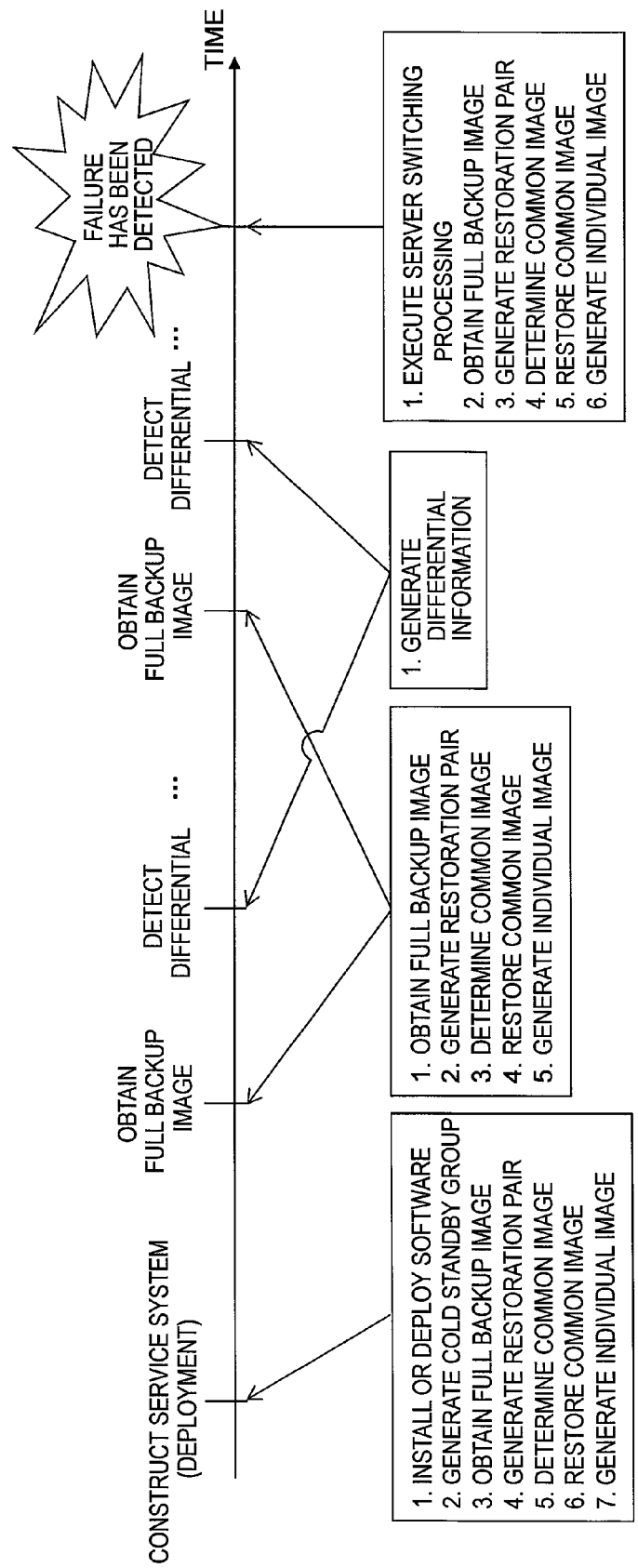
FIG. 10 is an explanatory diagram outlining processing in the first embodiment of this invention.

FIG. 10 is an explanatory diagram outlining processing in the first embodiment of this invention.

A service system is built first in the computer system. In a case of constructing a service system, the computer system executes the following processing.

First, software such as an OS is installed manually in the servers 110 or is deployed from the management server 100 or the like. The management server 100 next generates the cold standby groups 160 based on an input from an administrator or a user. For instance, the administrator or the user uses a given interface to set various types of information for generating the cold standby groups 160.

The management server 100 next obtains a full backup image of each active server 110. The management server 100 generates a plurality of restoration pairs 170 and determines for each restoration pair 170 a common image in the restoration pair 170. The management server 100 restores the determined common image to the auxiliary server 110 in each restoration pair. The management server 100 further generates, for each restoration pair, an individual image of the active server 110 that is included in the restoration pair.

Once the service system is built and starts running, the management server 100 obtains a full backup image cyclically. To obtain a full backup image, the following processing is executed.

The management server 100 obtains a full backup image of each active server 110. The management server 100 generates a plurality of restoration pairs 170 and determines for each restoration pair 170 a common image in the restoration pair 170. The management server 100 restores the determined common image to the auxiliary server 110 in each restoration pair. The management server 100 further generates, for each restoration pair, an individual image of the active server 110 that is included in the restoration pair.

The management server 100 also obtains differential information during a period between the obtainment of a full backup image and the obtainment of the next full backup image.

While the service system is running, the management server 100 monitors the behavior of the active servers 110 and, if a failure is found in one of the active servers 110, executes the following processing.

The management server 100 executes server switching processing. In this processing, the auxiliary server 110 in the restoration pair 170 that includes the failed active server 110 takes over the service of the failed active server 110.

Specifically, the management server 100 uses an individual image and common image of the failed active server 110 to restore the computer system to a state where the service can be executed, in other words, the state of the active server 110 at the time when a full backup image has been obtained.

With the common image thus restored to the internal storage device 305 of the auxiliary server 110 in advance, the management server 100 only needs to apply the individual image to the common image. This speeds up recovery from a failure in one of the active servers 110.

The management server 100 can also restore the computer system to the state of the active server 110 prior to the failure by applying the differential information.

After completing the server switching processing, the management server 100 obtains a full backup image of each active server 110. The management server 100 generates a plurality of restoration pairs 170, and determines for each restoration pair 170 a common image in the restoration pair 170. The management server 100 restores the determined common image to the auxiliary server 110 in each restoration pair. The management server 100 further generates, for each restoration pair, an individual image of the active server 110 that is included in the restoration pair.

As described above, a common image is restored for each restoration pair 170 to the auxiliary server 110. The common image to be restored needs to be one with which the service executed by the failed active server can be provided. This is for omitting processing of restoring a backup image to the auxiliary server 110 anew, so that quick switching between the servers 110 is accomplished.

For that purpose, the management server 100 sorts the active servers 110 based on the configurations of the active servers 110, and groups together the active servers 110 that have the same or a similar service type and configuration for executing the service. The management server 100 generates the restoration pairs 170 based on the result of the sorting. The problem in that a service implemented by a common image differs from a service executed by the failed active server 110 is thus solved.

The management server 100 can also restore the computer system to the state of the active server 110 prior to the failure by applying, in a case where the servers 110 are switched, differential information that has been generated during the cycle for obtaining a full backup image.

Figure 11A:
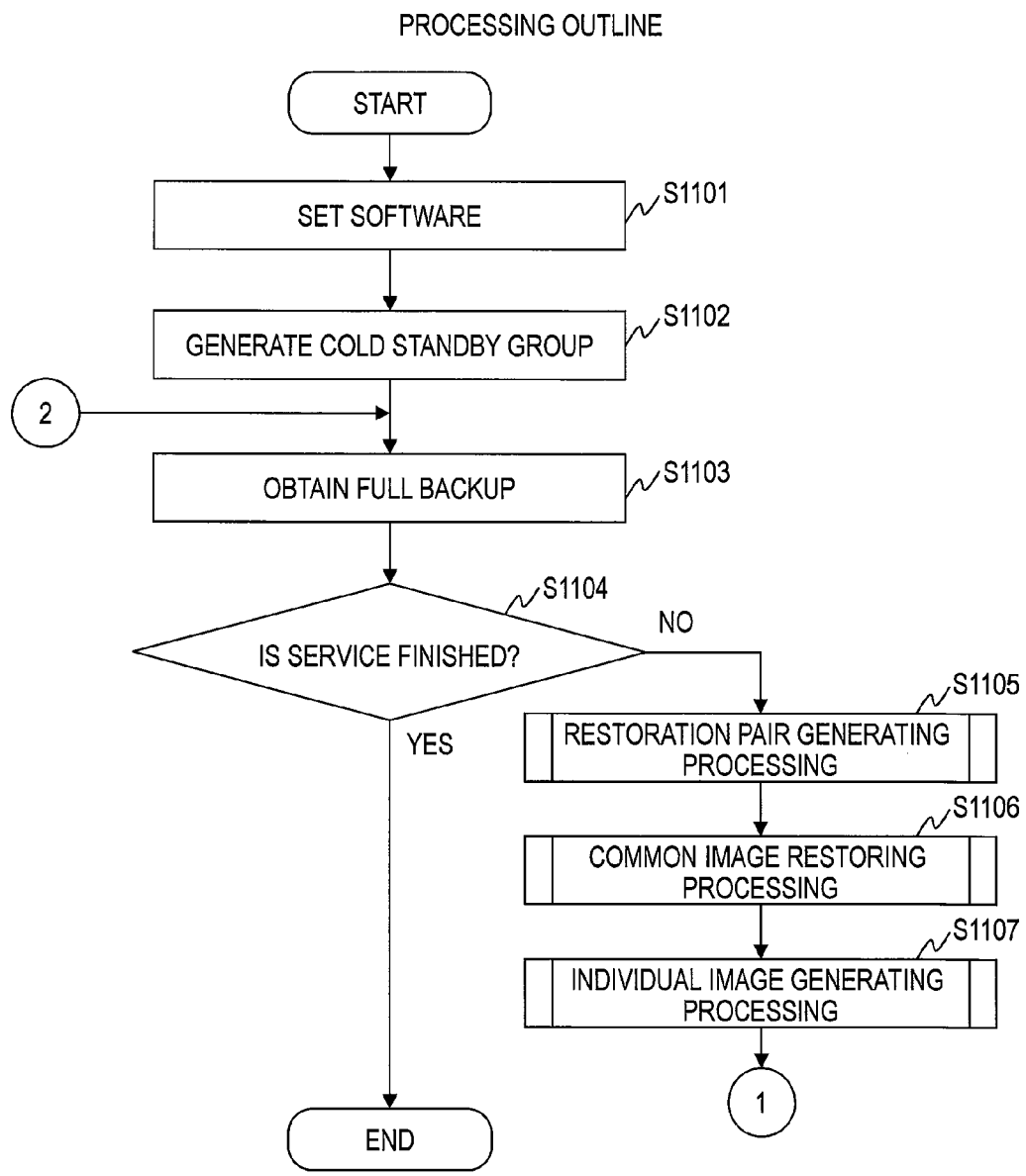
FIGS. 11A and 11B are flow charts outlining processing that are executed by the management server in the first embodiment of this invention.
Figure 11B:
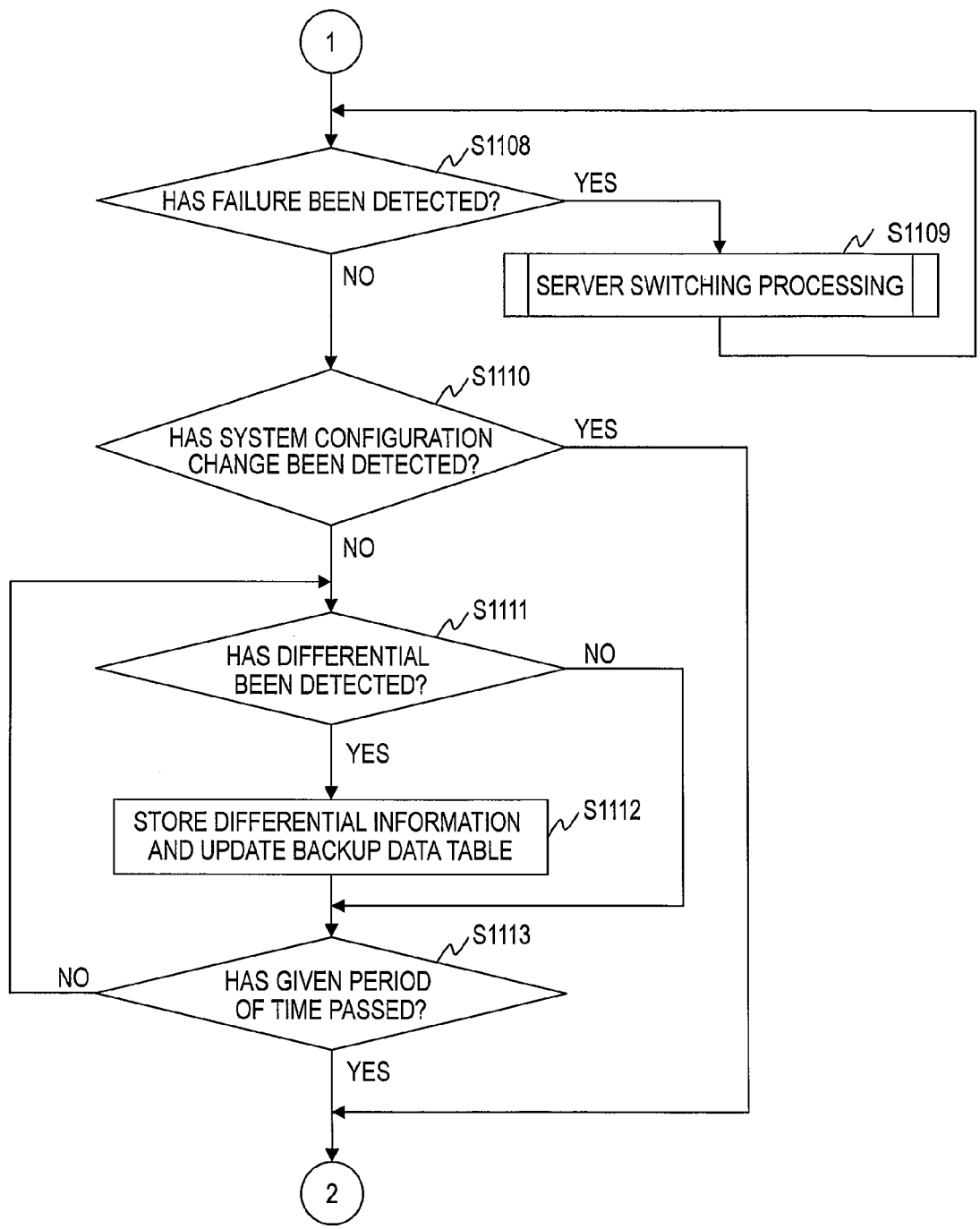

FIGS. 11A and 11B are flow charts outlining processing that are executed by the management server 100 in the first embodiment of this invention.

The management server 100 sets software such as an OS and an application in the servers 110 in order to construct a service system (Step S1101).

For instance, the management server 100 receives an input of software from an administrator or a user and installs the software in given servers 110. The management server 100 also reads software out of the external storage system 180 and deploys the software onto the given servers 110.

At this point, the server configuration information obtaining module 211 obtains performance information of the servers 110 from the servers 110, and the BIOS information obtaining module 212 obtains BIOS information from the servers 110 that are set as the active servers 110. The server management module 101 updates the server table 221 based on the obtained performance information and BIOS information of the servers 110. The server management module 101 also stores the obtained BIOS information in the external storage system 180. Known technologies can be used to obtain various types of information from the servers 110, and a description on how to obtain the information is therefore omitted.

The management server 100 next generates the cold standby groups 160 based on an input from the administrator or the user (Step S1102).

Specifically, the cold standby group generating module 213 generates cold standby groups. Known technologies can be used to generate the cold standby groups 160, and a description on how to generate the cold standby groups 160 is therefore omitted.

The management server 100 in this embodiment starts monitoring the active servers 110 after generating the cold standby groups 160. When to start the processing of monitoring the active servers 110 does not limit this invention.

The management server 100 next obtains full backup images of the active servers 110 that are included in the cold standby groups 160 (Step S1103). Specifically, the following processing is executed.

The management server 100 transmits the backup obtaining/restoring agent 236 to each active server 110 and instructs the backup obtaining/restoring agent 236 to obtain a full backup image. The backup obtaining/restoring agent 236 running on the active server 110 obtains a full backup image of the internal storage device 305 and transmits the obtained full backup image to the management server 100.

The full backup image obtaining module 232 of the management server 100 stores the received full backup image in the external storage system 180 and updates the full backup image configuration table 242. The management server 100 also initializes the backup data table 244. This is because the backup data table 244 is a table for managing the latest backup images.

In a case of constructing a service system, obtaining full backup images is not always necessary. The backup obtaining/restoring agent 236 keeps running on the active server 110.

The processing of Step S1103 has now been described.

The management server 100 next determines whether or not a service executed with the use of the service system has been finished (Step S1104). For instance, the management server 100 determines that a service has been finished in a case where the cold standby groups 160 are removed following the suspension of the service.

Determining that the service has been finished, the management server 100 ends the series of processing steps.

Determining that the service has not been finished, the management server 100 executes restoration pair generating processing (Step S1105). Details of the restoration pair generating processing are described later with reference to FIGS. 14 and 15.

The management server 100 executes common image restoring processing (Step S1106). Details of the common image restoring processing are described later with reference to FIG. 16.

The management server 100 executes individual image generating processing (Step S1107). Details of the individual image generating processing are described later with reference to FIG. 18.

The terms "full backup image", "common image", and "individual image" are described.

FIG. 12 is an explanatory diagram illustrating a backup image in the first embodiment of this invention.

FIG. 12 shows as an example a common image, a full backup image of a server A, and a full backup image of a server D.

The internal storage device 305 of each server 110 is constituted of the MBR and one or more partitions. A partition is a logical compartment and stores a plurality of files (a file set).

The management server 100 generates an individual image A by comparing the common image and the full backup image of the server A in a manner described later, and generates an individual image D by comparing the common image and the full backup image of the server D.

The description returns to FIGS. 11A and 11B.

The management server 100 next determines whether or not a failure has been detected in any of the active servers 110 (Step S1108). When to detect a failure in the active servers 110 is not limited thereto and detection can be made in any of the processing steps.

Determining that a failure has been detected in none of the active servers 110, the management server 100 proceeds to Step S1010.

Determining that a failure has been detected in one of the active servers 110, the management server 100 executes the server switching processing (Step S1109), and then returns to Step S1108. Details of the server switching processing are described later with reference to FIG. 19.

The management server 100 next determines whether or not a change in system configuration has been detected (Step S1110).

For instance, the management server 100 determines that a change in system configuration has been detected in a case where the configuration change receiving module 238 of the management server 100 receives a notification about an addition or deletion of the servers 110 from the hardware configuration change detecting unit 150. The management server 100 also determines that a change in system configuration has been detected in a case where a change in OS version, a change in OS, a change in the virtualization module, or the like is notified from the software configuration change detecting module 312.

Determining that a system configuration change has been detected, the management server 100 returns to Step S1103. This is because, in this case, the restoration pairs 170 need to be generated anew.

Determining that a system configuration change has not been detected, the management server 100 determines for each active server 110 whether or not a differential has been detected in the internal storage device 305 of the active server 110 (Step S1111).

Specifically, the management server 100 determines that a differential has been detected in the internal storage device 305 of the active server 110 in a case where the differential information receiving module 235 of the management server 100 receives differential information from the differential information obtaining module 311. The differential information obtaining module 311 transmits differential information along with the identification information of the active server 110 and the time of generation of the differential information.

Determining that a differential has not been detected in the internal storage device 305 of the active server 110, the management server 100 proceeds to Step S1113.

Determining that a differential has been detected in the internal storage device 305 of the active server 110, the management server 100 stores the received differential information in the external storage system 180 and updates the backup data table 244 (Step S1112). Specifically, the following processing is executed.

The differential information receiving module 235 of the management server 100 refers to the backup data table 244 and searches for an entry that matches the received identification information of the active server 110. The management server 100 stores the identification information of the received differential information as the differential information name 904 in the found entry, and stores the received time of generation as the timestamp 905 in the found entry.

FIG. 13 is an explanatory diagram illustrating an example of the backup table 245 in the first embodiment of this invention. Each time differential information is received, the management server stores the identification information and time of generation of the differential information in an entry for the relevant active server 110. In other words, in a case where a plurality of pieces of differential information are received from one active server 110, the management server 100 stores information about the plurality of pieces of differential information in an entry for the active server 110.

The processing of Step S1112 has now been described.

The management server 100 next determines whether or not a given period of time has elapsed since a full backup image has been obtained (Step S1113). In other words, the management server 100 determines whether or not a cycle for obtaining a full backup image has passed.

Determining that the cycle for obtaining a full backup image has not passed, the management server 100 returns to Step S1111.

Determining that the cycle for obtaining a full backup image has passed, the management server 100 returns to Step S1103.

Figure 14:
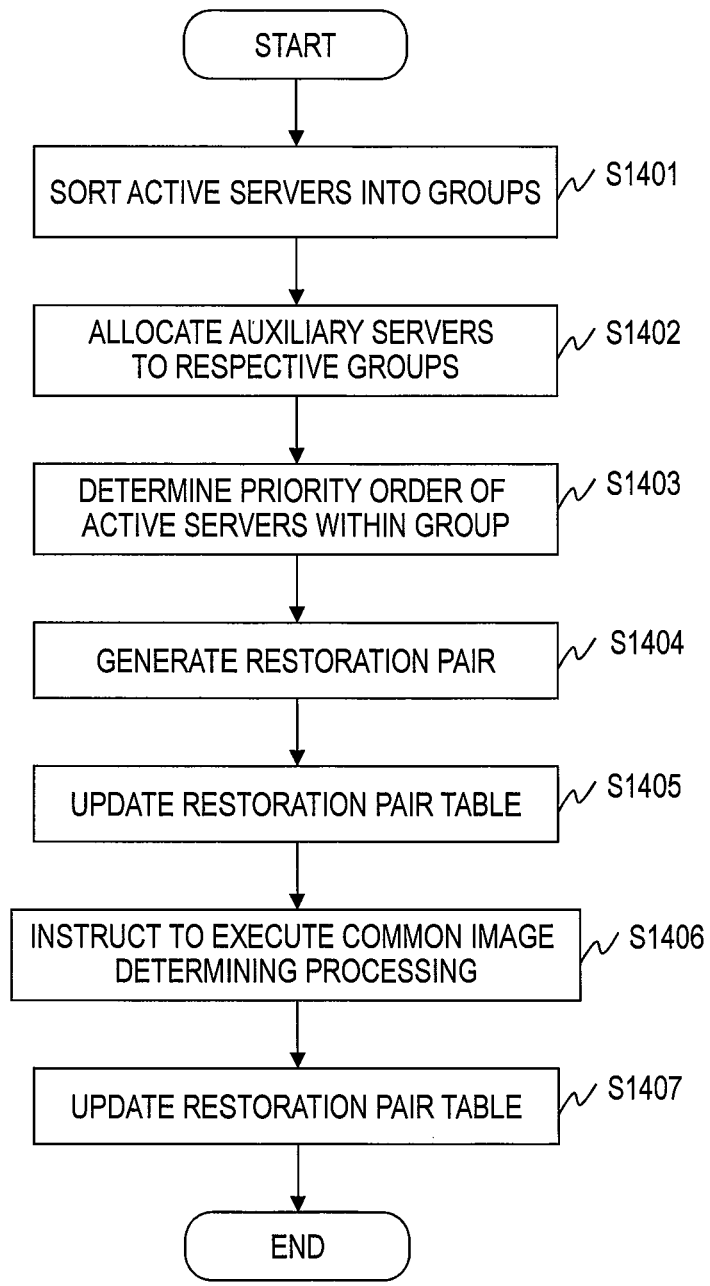
FIG. 14 is a flow chart illustrating an example of a restoration pair generating processing that is executed by the management server in the first embodiment of this invention.

FIG. 14 is a flow chart illustrating an example of the restoration pair generating processing that is executed by the management server 100 in the first embodiment of this invention.

In the case where an OS that is included in an image restored to the relevant auxiliary server 110 differs from the OS of the failed active server 110, the restored image cannot be used and a full backup image of the active server 110 needs to be restored anew. This hinders quick switching between the servers 110.

In this invention, the restoration pairs 170 for the efficient restoration of a full backup image are generated by sorting a plurality of active servers 110 that are included in the cold standby groups 160 and grouping together the servers 110 that have the same or a similar configuration for executing the service. Quick switching between the servers 110 is thus accomplished.

The restoration pair generating module 231 executes the restoration pair generating processing for each cold standby group 160. The following description takes as an example the case where there is one cold standby group 160.

The restoration pair generating module 231 sorts a plurality of active servers 110 included in the cold standby group 160 into a plurality of groups (Steps S1401). Specifically, the following processing is executed.

The restoration pair generating module 231 refers to the cold standby group table 222 to identify the plurality of active servers 110 included in the cold standby group 160. The restoration pair generating module 231 also refers to the server table 221 to obtain information about the configuration of every identified active server 110.

The restoration pair generating module 231 in this embodiment obtains information that is stored as the OS 406 in the server table 221. The restoration pair generating module 231 sorts the plurality of active servers 110 into a plurality of groups by OS type. A group includes at least one active server 110.

This sorting method is an example and this invention is not limited thereto. For instance, the restoration pair generating module 231 may sort the plurality of active servers 110 into a plurality of groups based on hardware configuration such as the type of the active servers 110, or software configuration such as application type or virtualization software type.

The processing of Step S1401 has now been described.

The restoration pair generating module 231 next allocates a plurality of auxiliary servers 110 that are included in the cold standby group 160 to the respective groups (Step S1402).

Specifically, the restoration pair generating module 231 determines for each group the number of the auxiliary servers 110 to be allocated to the group based on the number of the active servers 110 that are included in the group.

The restoration pair generating module 231 refers to the server table 221 to allocate to each group the determined number of auxiliary servers 110 whose hardware configuration is the same as or similar to that of the active servers 110 included in the group.

This method of allocating the auxiliary servers 110 is an example and this invention is not limited thereto.

The restoration pair generating module 231 next determines for each group the priority order of the active servers 110 that are included in the group (Step S1403).

Specifically, the restoration pair generating module 231 determines the priority order so that the active server 110 that is likely to fail is placed high in the order of priority. For example, the priority order can be determined by the following methods.

One method is to determine based on history information of failure such as read error of the internal storage device 305. The restoration pair generating module 231 in this case refers to the server table 221 and sequentially gives higher places in the priority order to the active servers 110 in the group that have larger values as the read error count 405 in entries for the active servers 110.

Another method is to determine based on the running time of the active servers 110. The restoration pair generating module 231 in this case sequentially gives higher places in the priority order to the active servers 110 that have longer running times.

How high the possibility of a failure is may be unknown at the time of constructing a service system. The restoration pair generating module 231 in this case determines the priority order so that the active servers 110 that have been entered in the server table 221 earlier are given higher places in the order of priority.

These priority order determining methods are examples, and this invention is not limited thereto.

The restoration pair generating module 231 next generates a plurality of restoration pairs 170 by associating active servers that are included in one group with the auxiliary servers 110 that are allocated to the group (Step S1404). Specifically, the following processing is executed.

The restoration pair generating module 231 selects one group as a processing target. The restoration pair generating module 231 associates the active servers 110 that are included in the selected group with the auxiliary servers 110 based on the priority order of the included active servers 110, to thereby generate one or more restoration pairs 170. The restoration pair generating module 231 also determines identification information of the plurality of generated restoration pairs 170.

In this embodiment, one restoration pair 170 is generated in a case where the selected group is allocated one auxiliary server 110 and, in a case where the selected group is allocated a plurality of auxiliary servers 110, as many restoration pairs 170 as the number of the allocated auxiliary servers 110 are generated. A plurality of restoration pairs 170 can be generated by, for example, the following method.

In the case where the selected group is allocated two auxiliary servers 110, the restoration pair generating module 231 associates one of the allocated auxiliary servers 110 with the active server 110 that has an odd value as its place in priority order, and associates the other auxiliary server 110 with the active server 110 that has an even number as its place in priority order.

Another possible method is as follows. In the case where the selected group is allocated n auxiliary servers 110, the restoration pair generating module 231 assigns numbers "0" to "n−1" to the auxiliary servers 110. The restoration pair generating module 231 calculates, for each active server 110 in the group, the remainder of the division of the priority order value of the active server 110 by "n". The restoration pair generating module 231 associates the auxiliary server assigned a number "k" with the active server 110 that has "k" as the calculated remainder.

These methods are examples, and this invention is not limited thereto. Any method can be employed as long as the method avoids associating the active servers 110 that have a higher possibility of failure concentratedly with one auxiliary server 110.

In this embodiment, one auxiliary server and one or more active servers 110 constitute one restoration pair 170. In the event of a failure in one of the active servers 110 in the restoration pair 170, the auxiliary server 110 included in the restoration pair takes over the service.

The restoration pair generating module 231 executes the processing described above for every group.

The processing of Step S1404 has now been described.

The restoration pair generating module 231 next updates the restoration pair table 241 based on information about the plurality of generated restoration pairs 170 (Step S1405). Specifically, the following processing is executed.

The restoration pair generating module 231 stores identification information of each of the plurality of generated restoration pairs 170 as the restoration pair name 601, and stores identification information of the cold standby group 160 as the cold standby group name 602.

The restoration pair generating module 231 also stores for each restoration pair 170 identification information of the auxiliary server 110 that is included in the restoration pair 170 as the auxiliary server name 603, and stores identification information of each active server 110 included in the restoration pair 170 as the active server name 604. The restoration pair generating module 231 further stores the priority order determined in Step 1403 as the priority order 605. Fields for the common image name 606 and the restoration flag 607 are empty at this point.

The processing of Step S1405 has now been described.

The restoration pair generating module 231 next outputs an instruction to execute common image determining processing to the common image determining module 233 (Step S1406). The restoration pair generating module 231 stands by until a notification of the completion of the processing is received from the common image determining module 233. Details of the common image determining processing are described later with reference to FIG. 16.

The restoration pair generating module 231 updates the restoration pair table 241 based on the processing result received from the common image determining module 233 (Step S1407), and ends the processing.

Specifically, the restoration pair generating module 231 refers to the restoration pair table 241 and identifies an entry to be updated based on identification information of the restoration pair 170 that is included in the processing result. The restoration pair generating module 231 stores identification information of the determined common image as the common image name 606 and stores "unrestored" as the restoration flag 607 in the identified entry.

The processing of Step S1403 may be omitted. The restoration pair generating module 231 in this case generates the restoration pairs 170 by associating for each group the active servers 110 that are included in the group with one or more auxiliary servers 110 that are allocated to the group.

A concrete example of the processing from Steps S1401 to S1404 is described with reference to FIG. 4.

In Step S1401, the following processing is executed.

The restoration pair generating module 231 refers to the cold standby group table 222 and identifies that a "cold standby group 1" includes five active servers, a server A, a server B, a server C, a server D, and a server E.

The restoration pair generating module 231 refers to the server table 221 and sorts the active servers into a group 1 where the OS 406 is "OS 1" and a group 2 where the OS 406 is "OS 2". The group 1 includes the server A, the server B, the server D, and the server E. The group 2 includes the server C.

In Step S1402, the following processing is executed.

With four active servers 110 included in the group 1 and one active server 110 included in the group 2, the restoration pair generating module 231 determines the number of the auxiliary servers 110 to be allocated to group 1 and the number of the auxiliary servers 110 to be allocated to the group 2 so that the proportion of the former to the latter is 4:1. This proportion is given as a rough measure and it is not always necessary to determine the numbers of the auxiliary servers 110 so that the actual proportion exactly matches this proportion.

The number of the auxiliary servers 110 that are included in the "cold standby group 1" is "3". Based on the proportion given above, the restoration pair generating module 231 allocates two auxiliary servers 110 to the group 1 and one auxiliary server 110 to the group 2. Here, the restoration pair generating module 231 allocates a server X and a server Y to the group 1 and allocates a server Z to the group 2.

The following processing is executed in Step S1403. Described here is a case where the priority order determining method based on the read error count 405 is employed.

The restoration pair generating module 231 assigns a high place in priority order to the server D, the server B, the server A, and the server E in the group 1 in the order stated, and assigns a high place in priority order to the server C in the group 2.

In Step S1404, the following processing is executed.

The restoration pair generating module 231 associates the server X with the server D and the server A, associates the auxiliary server Y with the servers B and E, and associates the server Z with the server C, to thereby generate three restoration pairs 170.

Figure 15:
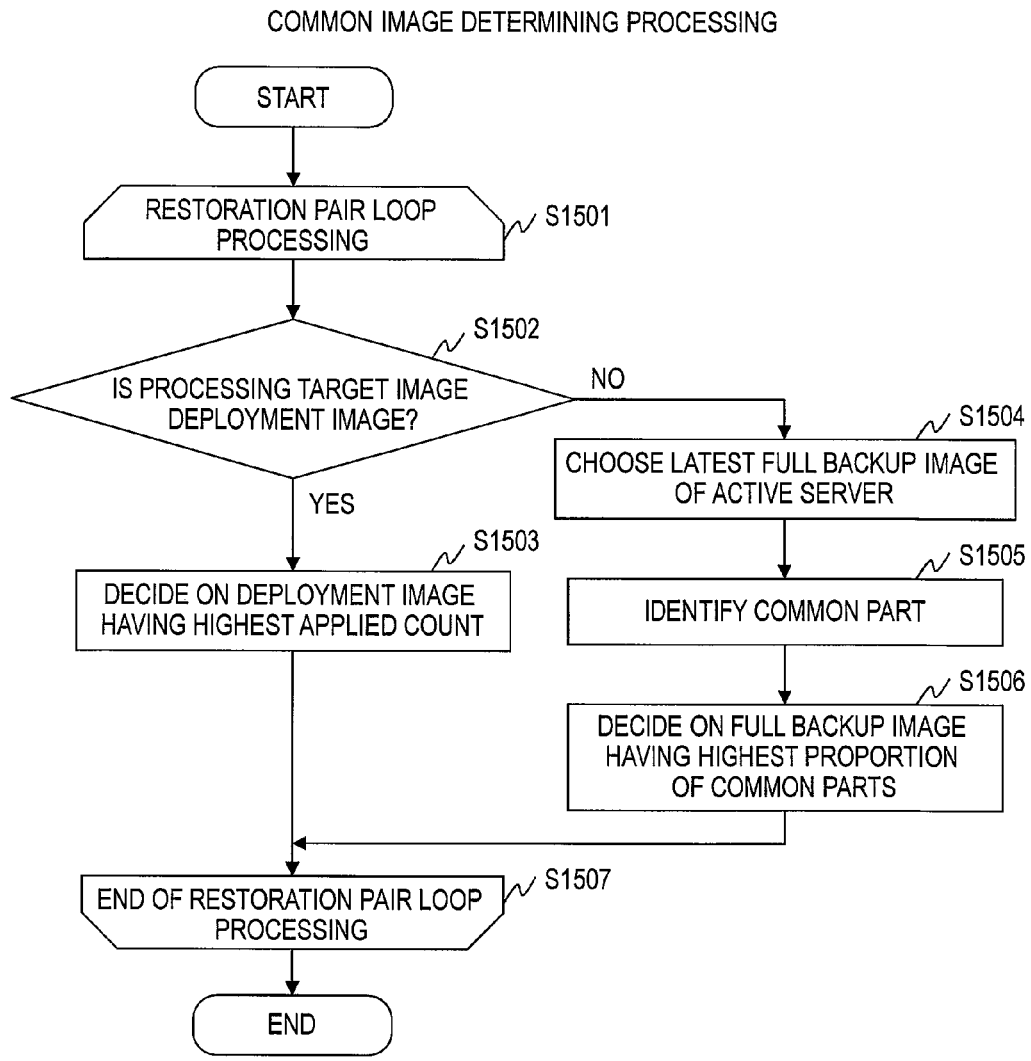
FIG. 15 is a flow chart illustrating an example of common image determining processing that is executed by the management server in the first embodiment of this invention.

FIG. 15 is a flow chart illustrating an example of the common image determining processing that is executed by the management server 100 in the first embodiment of this invention.

The common image determining module 233 receives an instruction to execute the common image determining processing from the restoration pair generating module 231 and then starts the processing.

The common image determining module 233 refers to the restoration pair table 241 to select the restoration pair 170 that is the processing target from among the plurality of generated restoration pairs 170 (Step S1501).

Specifically, the common image determining module 233 selects an entry for one of the restoration pairs 170 from the restoration pair table 241. The common image determining module 233 in this embodiment selects entries of the restoration pair table 241 one at a time from top downward.

Steps S1501 to S1507 are loop processing for the restoration pairs 170. Processing of Steps S1502 to S1506 is executed repeatedly until each restoration pair 170 is processed.

The common image determining module 233 determines whether or not full backup images of all active servers 110 that are included in the selected restoration pair 170 are deployment images (Step S1502). In other words, the common image determining module 233 determines whether the full backup images are for processing that is executed to construct a service system or processing that is executed to run a service system. The processing in question is determined as one that is executed to construct a service system in a case where the full backup images of all the active servers 110 are deployment images. Specifically, the following processing is executed.

The common image determining module 233 refers to the restoration pair table 241 to obtain identification information of every active server 110 included in the selected restoration pair 170.

Based on the obtained identification information of the servers 110, the common image determining module 233 refers to the full backup image configuration table 242 to obtain identification information of a full backup image for each active server 110 included in the selected restoration pair 170. Specifically, the common image determining module 233 searches for an entry in which the active server name 702 matches the obtained identification information of the server 110, and obtains full backup image identification information from the full backup image name 701 of the found entry.

Based on the obtained full backup image identification information, the common image determining module 233 determines for each active server 110 that is included in the selected restoration pair 170 whether or not the active server's full backup image is a deployment image.

From the result of this determination, the common image determining module 233 determines whether or not full backup images of all active servers 110 that are included in the selected restoration pair 170 are deployment images.

The processing of Step S1502 has now been described.

Determining that full backup images of all active servers 110 that are included in the selected restoration pair 170 are deployment images, the common image determining module 233 determines, as a common image, a deployment image that has the highest applied count of the deployment images (Step S1503). For example, the management server 100 keeps the applied count of each deployment image and determines a common image based on the applied count.

In the case where it is determined in Step S1502 that not all of the active servers 110 included in the selected restoration pair 170 have full backup images that are deployment images, the common image determining module 233 selects the latest file backup image for every active server 110 included in the selected restoration pair 170 (Step S1504).

Specifically, the common image determining module 233 refers to the full backup image configuration table 242 and identifies an entry for every active server 110 included in the selected restoration pair 170. The common image determining module 233 selects an entry whose timestamp 805 is the latest among the identified entries.

The common image determining module 233 compares the selected full backup images to identify a part common to the full backup images (Step S1505).

For example, in the case where the selected restoration pair 170 includes three active servers 110, a server A, a server B, and a server C, the common image determining module 233 compares full backup images of the server A, the server B, and the server C against one another. Specifically, the common image determining module 233 compares the full backup image of the server A against the full backup images of the server B and the server C, compares the full backup image of the server B against the full backup images of the server A and the server C, and compares the full backup image of the server C against the full backup images of the server A and the server B.

Based on the result of the full backup image comparison, the common image determining module 233 determines, as a common image, a full backup image that shares the highest proportion of common parts with other full backup images (Step S1506).

In this embodiment, a full backup image that has the largest number of common files or the largest data capacity of common files is determined as a common image. For example, in the case where the number of files in the full backup image of the server A that are common to the full backup images of the server B and the server C is "100", the number of files in the full backup image of the server B that are common to the full backup images of the server A and the server C is "200", and the number of files in the full backup image of the server C that are common to the full backup images of the server A and the server B is "120", the full backup image of the server B is determined as a common image.

In the case where not all of the restoration pairs 170 have been processed in Step S1507, the common image determining module 233 returns to Step S1502 to select the next restoration pair 170. In the case where all of the restoration pairs 170 have been processed in Step S1507, the common image determining module 233 ends the processing.

After ending the processing, the common image determining module 233 transmits to the restoration pair generating module 231 a processing completion notification which includes identification information of each common image and identification information of each restoration pair.

Figure 16:
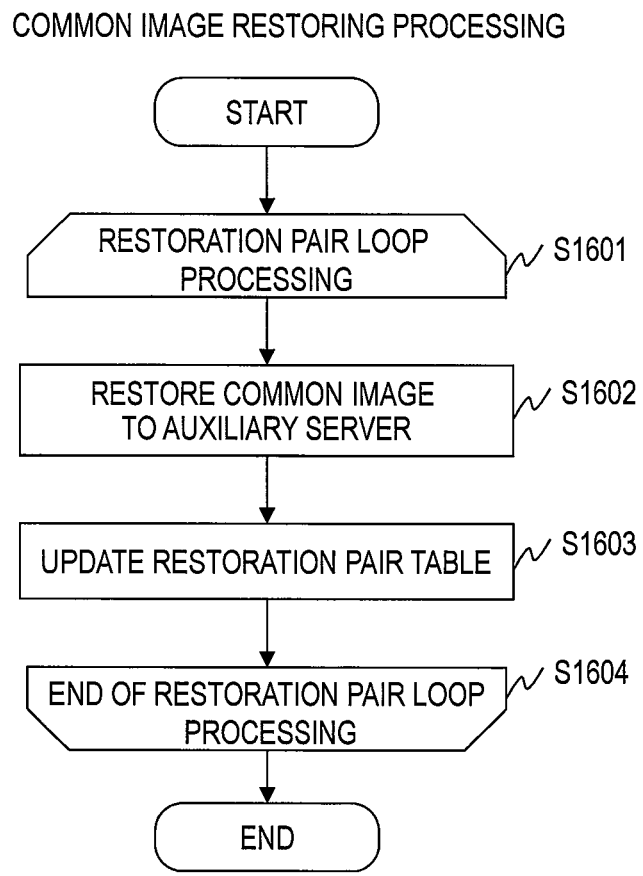
FIG. 16 is a flow chart illustrating an example of common image restoring processing that is executed by the management server in the first embodiment of this invention.

FIG. 16 is a flow chart illustrating an example of the common image restoring processing that is executed by the management server 100 in the first embodiment of this invention.

The common image restoring processing is executed by the restoring module 237.

The restoring module 237 refers to the restoration pair table 241 to select the restoration pair 170 that is the processing target from among the plurality of generated restoration pairs 170 (Step S1601).

Specifically, the restoring module 237 selects an entry for one of the restoration pairs 170 from the restoration pair table 241. The restoring module 237 in this embodiment selects entries of the restoration pair table 241 one at a time from top downward.

Steps S1601 to S1604 are loop processing for the restoration pairs 170. Processing of Steps S1602 and S1603 is executed repeatedly until each restoration pair 170 is processed.

The restoring module 237 restores a common image to the auxiliary server 110 that is included in the selected restoration pair 170 (Step S1602). Specifically, the following processing is executed.

The restoring module 237 refers to the restoration pair table 241 and identifies a common image based on the common image name 606 of the entry for the selected restoration pair 170. The restoring module 237 obtains from the external storage system 180 a full backup image that corresponds to the identified common image.

The restoring module 237 transmits a boot instruction, along with the backup obtaining/restoring agent 236, to the auxiliary server 110 that is identified by the auxiliary server name 603 of this entry. This causes the backup obtaining/restoring agent 236 to run on the active server 110.

The restoring module 237 transmits the obtained full backup image to the auxiliary server 110. The backup obtaining/restoring agent 236 running on the auxiliary server 110 restores the received image to the internal storage device 305.

The processing of Step S1602 has now been described.

The restoring module 237 next updates the restoration flag 607 of the restoration pair table 241 (Step S1603).

Specifically, the restoring module 237 stores "restored" as the restoration flag 607 in the restoration pair table 241.

In the case where not all of the restoration pairs 170 have been processed, the restoring module 237 returns to Step S1602 to select the next restoration pair 170. In the case where all of the restoration pairs 170 have been processed, the restoring module 237 ends the processing.

FIG. 17 is an explanatory diagram illustrating an example of the restoration pair table 241 in the first embodiment of this invention. FIG. 17 shows how the restoration pair table 241 looks after the common image restoring processing is finished.

Figure 18:
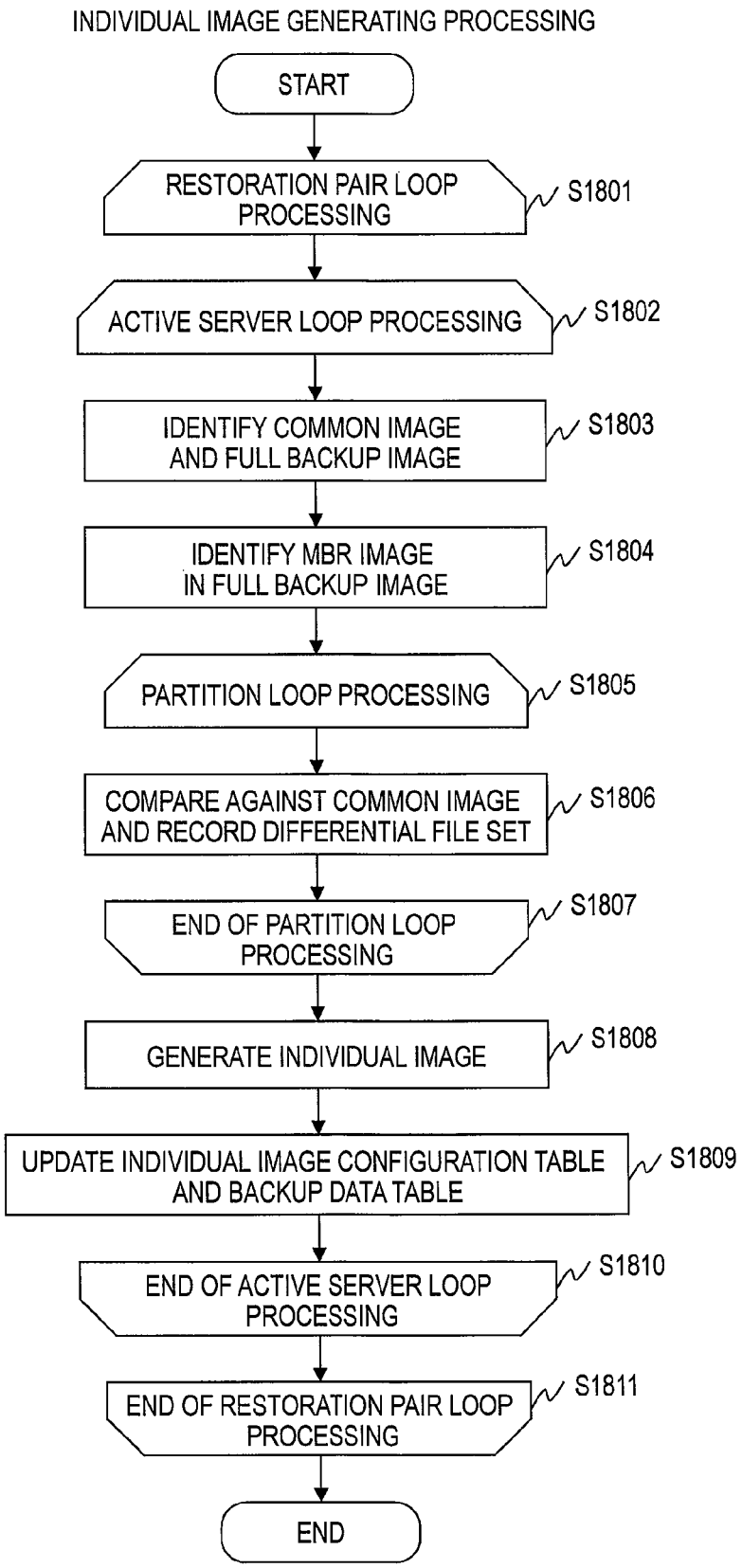
FIG. 18 is a flow chart illustrating an example of individual image generating processing that is executed by the management server in the first embodiment of this invention.

FIG. 18 is a flow chart illustrating an example of the individual image generating processing that is executed by the management server 100 in the first embodiment of this invention.

The common image determining module 233 refers to the restoration pair table 241 to select the restoration pair 170 that is the processing target from among the plurality of restoration pairs 170 (Step S1801).

Specifically, the common image determining module 233 selects an entry for one of the restoration pairs 170 from the restoration pair table 241. In this embodiment, entries of the restoration pair table 241 are selected one at a time from top downward.

Steps S1801 to S1811 are loop processing for the restoration pairs 170. Processing of Steps S1802 to S1810 is executed repeatedly until each restoration pair 170 is processed.

The individual image generating module 234 selects one of the active servers that are included in the selected restoration pair 170 (Step S1802).

The processing of Steps S1802 to S1810 is loop processing for the active servers 110. The processing of Steps S1803 to S1809 is executed repeatedly until each active server 110 is processed.

The individual image generating module 234 identifies a common image of the selected restoration pair 170 and a full backup image of the selected active server 110 (Step S1803). Specifically, the following processing is executed.

The individual image generating module 234 refers to the restoration pair table 241 to identify an entry for the selected restoration pair 170, and obtains identification information of the common image from the common image name 606 of the identified entry. Based on the identification information of the common image, the individual image generating module 234 refers to the full backup image configuration table 242 to identify an entry for a full backup image that corresponds to the common image.

The individual image generating module 234 also refers to the full backup image configuration table 242 to identify an entry for the selected active server 110.

In the following description, the common image of the selected restoration pair 170 is also referred to as "target common image", and the full backup image of the selected active server 110 is also referred to as "target full backup image".

The processing of Step S1803 has now been described.

The individual image generating module 234 next identifies an MBR image of the target full backup image (Step S1804).

Specifically, the individual image generating module 234 identifies an MBR image of the target full backup image by referring to the MBR image name 703 of the identified entry for the active server 110.

The individual image generating module 234 next selects one partition from the file area of the target full backup image (Step S1805).

The processing of Steps S1805 to S1807 is loop processing for partitions. The processing of Step S1806 is executed repeatedly until each partition of the target full backup image is processed.

The individual image generating module 234 compares the partition of the target full backup image against a partition of the target common image that corresponds to the former partition, and records a differential file set (Step S1806).

Specifically, the individual image generating module 234 records, in the memory 202, as a differential file set, a file that has been changed from one in a file set stored in the partition of the target common image and a file deleted from the stored file set. The differential file set may instead be recorded in the external storage system 180.

In the case where not all of partitions in the target full backup image have been processed in Step S1807, the individual image generating module 234 returns to Step S1805 to execute the same processing for the next partition.

In the case where all of partitions in the target full backup image have been processed in Step S1807, the individual image generating module 234 generates an individual image based on the MBR image identified in Step S1804 and the differential files recorded in Step S1806 (Step S1808). The generated individual image is stored in the external storage system 180.

The individual image generating module 234 is not required to generate a concrete image. The individual image generating module 234 only needs to generate information recognizable as an individual image by, for example, associating an MBR image and a differential file.

Based on information of the generated individual image, the individual image generating module 234 updates the individual image configuration table 243 and the backup data table 244 (Step S1809).

The individual image configuration table 243 is updated as follows.

The individual image generating module 234 adds an entry to the individual image configuration table 243, and stores identification information of the generated individual image as the individual image name 801 and identification information of the MBR identified in Step S1802 as the MBR image name 802 in the added entry.

In the added entry, the individual image generating module 234 also stores as the file set name 803 identification information of an added or updated file set out of the differential file sets, and stores as the file set name 804 identification information of a deleted file set out of the differential file sets. The individual image generating module 234 further stores the time of generation of the individual image as the timestamp 805 in the added entry.

The backup data table 244 is updated as follows.

The individual image generating module 234 adds a new entry to the backup data table 244, and stores identification information of the selected active server 110 as the active server name 901 in the added entry. The individual image generating module 234 also stores identification information of the identified common image as the common image name 902 and stores identification information of the generated individual image as the individual image name 903 in the added entry.

Fields for the differential information name 904 and the timestamp 905 are empty in the added entry.

The processing of Step S1809 has now been described.

In the case where not all of the active servers 110 that are included in the selected restoration pair 170 have been processed in Step S1810, the individual image generating module 234 returns to Step S1802 to select the next active server 110 and execute the same processing.

In the case where all of the active servers 110 that are included in the selected restoration pair 170 have been processed in Step 1810, the individual image generating module 234 proceeds to Step S1811.

In the case where not all of the restoration pairs 170 have been processed in Step S1811, the individual image generating module 234 returns to Step S1801 to select the next restoration pair 170 and execute the same processing.

In the case where all of the restoration pairs 170 have been processed in Step S1811, the individual image generating module 234 ends the processing.

The individual image generating module 234 may generate a new individual image by modifying an older individual image so that differential information is updated, in a case where the number of pieces of differential information stored as the differential information 904 in one entry of the backup data table 244 is equal to or higher than a given count, or cyclically.

Figure 19:
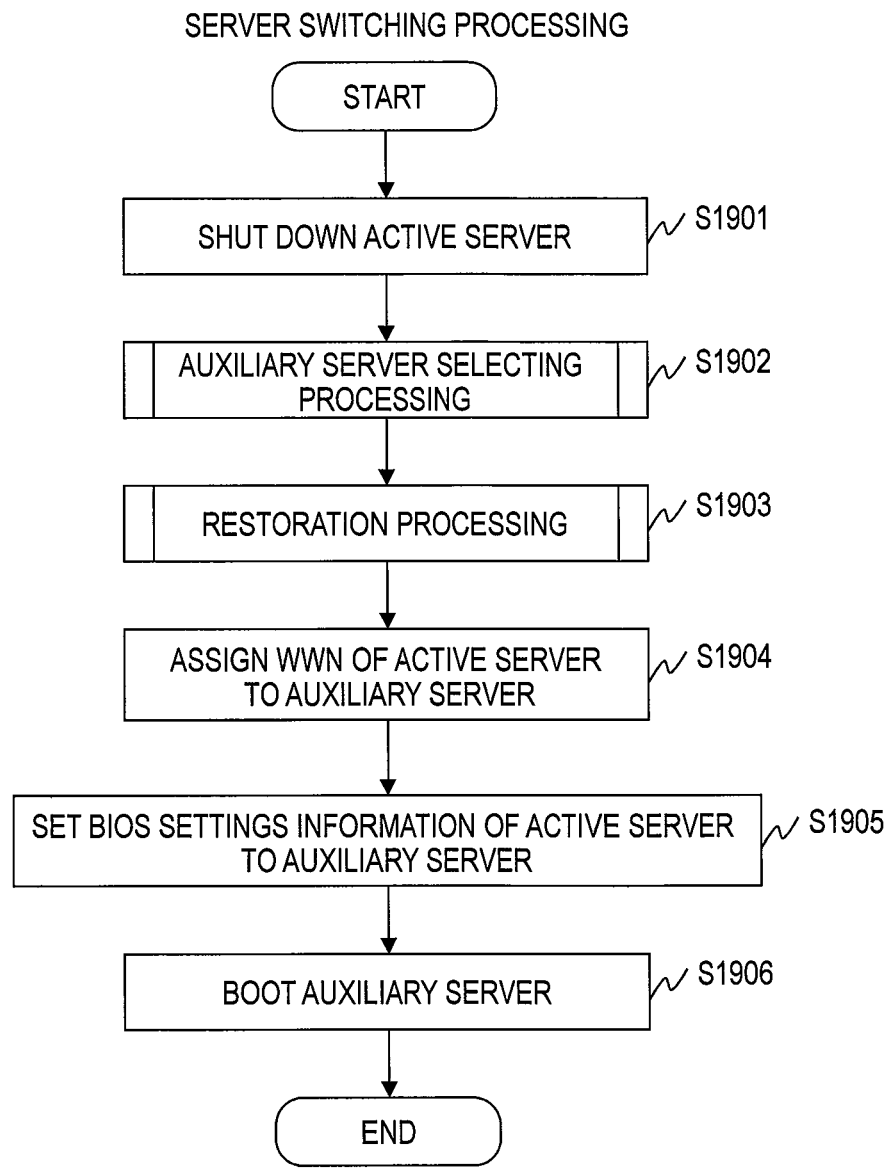
FIG. 19 is a flow chart illustrating an example of server switching processing that is executed by the management server in the first embodiment of this invention.

FIG. 19 is a flow chart illustrating an example of the server switching processing that is executed by the management server 100 in the first embodiment of this invention.

The management server 100 starts the server switching processing in a case where a failure is detected in one of the active servers 110. The server management module 101 in this embodiment obtains identification information of the failed active server 110 and information including the cause of the failure.

This invention is not limited to a particular method of detecting a failure in the active servers 110, and can use any method as long as the active server 110 in which a failure has occurred can be identified.

The management server 100 shuts down the failed active server 110 (Step S1901).

For example, the management server 100 transmits a shutdown instruction to the backup obtaining/restoring agent 236 that is running on the failed active server 110. Receiving the shutdown instruction, the backup obtaining/restoring agent 236 brings the failed active server 110 to a powered off state.

The management server 100 executes auxiliary server selecting processing for selecting one of the auxiliary servers 110 (Step S1902). The management server 100 also executes restoration processing for restoring backup data to the selected auxiliary server 110 (Step S1903).

Details of the auxiliary server selecting processing are described later with reference to FIG. 20. Details of the restoration processing are described later with reference to FIG. 21.

The management server 100 assigns the WWN of the failed active server 110 to the auxiliary server selected by the auxiliary server selecting processing (Step S1904).

Specifically, the WWN changing module 215 assigns a WWN that has been used by the failed active server 110 to the selected auxiliary server 110.

The management server 100 sets BIOS settings information of the failed active server 110 in the auxiliary server 110 selected by the auxiliary server selecting processing (Step S1905). Specifically, the following processing is executed.

The BIOS information restoring module 216 uses the identification information of the failed active server 110 to search the server table 221 for an entry for the failed active server 110. Based on the BIOS information 410 of the found entry, the BIOS information restoring module 216 obtains identification information of BIOS information of the failed active server 110.

The BIOS information restoring module 216 uses the obtained identification information of the BIOS information to obtain from the external storage system 180 BIOS information of the identified active server 110. The BIOS information restoring module 216 further sets the obtained BIOS information in the selected auxiliary server 110.

The processing of Step S1905 has now been described.

The management server 100 next boots the selected auxiliary server 110 (Step S1906) and ends the processing. For example, the management server 100 transmits an instruction to boot the selected auxiliary server 110 to the backup obtaining/restoring agent 236 that runs on the selected auxiliary server 110.

Figure 20:
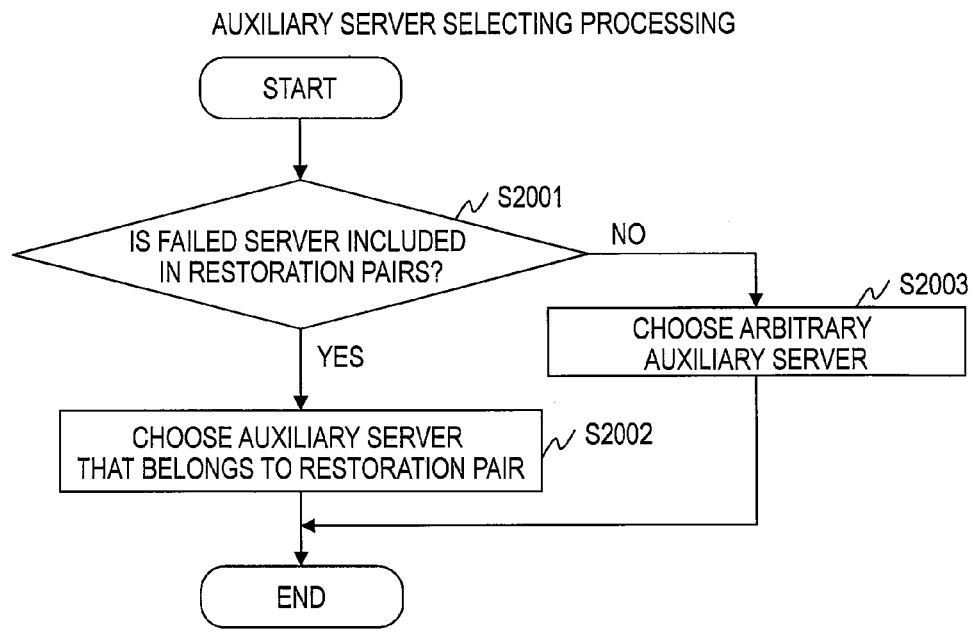
FIG. 20 is a flow chart illustrating an example of auxiliary server selecting processing that is executed by the management server in the first embodiment of this invention.

FIG. 20 is a flow chart illustrating an example of the auxiliary server selecting processing that is executed by the management server 100 in the first embodiment of this invention.

The management server 100 determines whether or not the failed active server 110 is the active server 110 that is included in one of the restoration pairs 170 (Step S2001).

Specifically, the failover destination server selecting module 214 uses the identification information of the failed active server 110 to refer to the active server name 604 of the restoration pair table 241. In the case where an entry holding the identification information of the failed active server 110 as the active server name 604 is found in the restoration pair table 241, the failover destination selecting module 214 determines that the failed active server 110 is the active server 110 that is included in one of the restoration pairs 170.

In a case where it is determined that the failed active server is the active server 110 that is included in one of the restoration pairs 170, the management server 100 selects one of the auxiliary servers 110 that are included in this restoration pair 170 (Step S2002), and ends the processing.

For example, the failover destination server selecting module 214 may choose the auxiliary server 110 that has the same hardware configuration as that of the failed active server 110. This invention is not limited by how the failover destination auxiliary server 110 is selected.

In this embodiment, where one or more active servers 110 and one auxiliary server 110 constitute one restoration pair 170, the failover destination auxiliary server 110 is selected automatically.

In a case where it is determined that the failed active server 110 is not the active server 110 that is included in one of the restoration pairs 170, the management server 100 chooses an arbitrary auxiliary server 110 from among the auxiliary servers 110 that are included in the relevant cold standby group 160 (Step S2003), and ends the processing.

Figure 21:
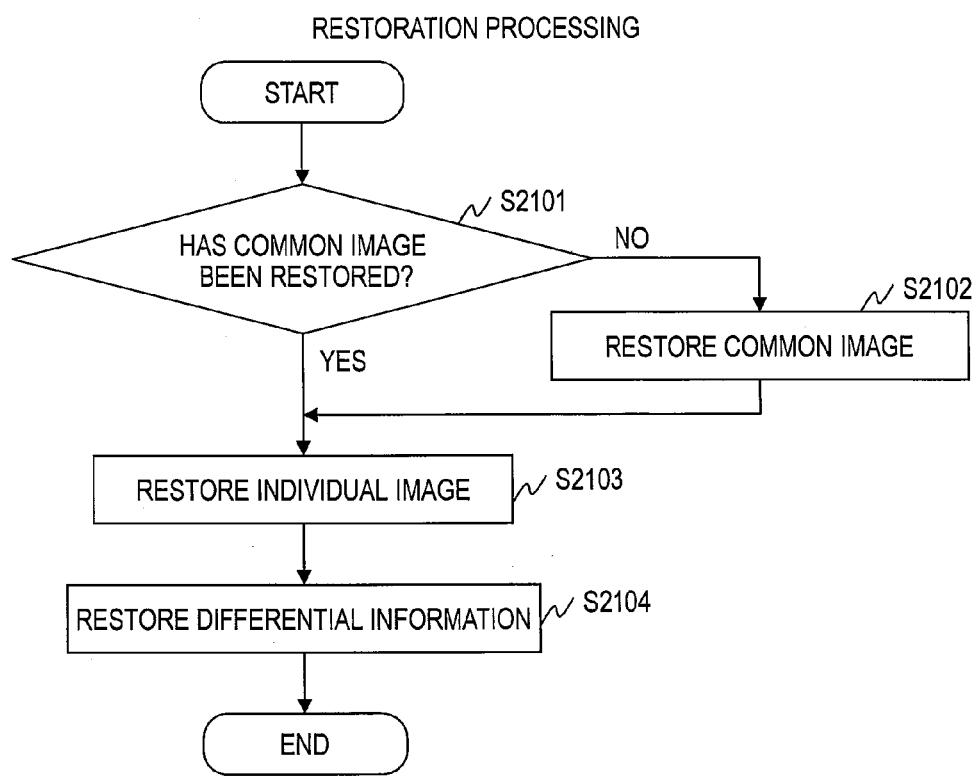
FIG. 21 is a flow chart illustrating an example of restoration processing that is executed by the management server in the first embodiment of this invention.

FIG. 21 is a flow chart illustrating an example of the restoration processing that is executed by the management server 100 in the first embodiment of this invention.

The management server 100 determines whether or not a common image has been restored to the failover destination auxiliary server 110 (Step S2101).

Specifically, the restoring module 237 uses identification information of the failover destination auxiliary server 110 to search the restoration pair table 241 for an entry for the failover destination auxiliary server 110. The restoring module 237 determines whether or not "restored" is stored as the restoration flag 607 in the found entry.

In a case where it is determined that a common image has not been restored to the failover destination auxiliary server 110, the management server 100 restores a common image to the failover destination auxiliary server 110 (Step S2102), and proceeds to Step S2103.

Specifically, the restoring module 237 refers to the common image name 606 of the found entry to identify the relevant common image, and obtains the identified common image from the external storage system 180. The restoring module 237 further restores the obtained common image to the failover destination auxiliary server 110.

In a case where it is determined that a common image has been restored to the failover destination auxiliary server 110, the management server 100 restores an individual image of the failed active server 110 to the failover destination auxiliary server 110 (Step S2103). Specifically, the following processing is executed.

The restoring module 237 uses the identification information of the failed active server 110 to search the backup data table 244 for an entry for the failed active server 110. The restoring module 237 refers to the individual image name 903 of the found entry to identify identification information of the failed server's individual image.

The restoring module 237 uses the identified identification information of the individual image information to obtain the individual image from the external storage system 180, and restores the obtained individual image to the failover destination auxiliary server 110.

The processing of Step S2103 has now been described.

The management server 100 next restores differential information of the failed active server 110 to the failover destination auxiliary server 110 (Step S2104) and ends the processing. Specifically, the following processing is executed.

The restoring module 237 uses the identification information of the failed active server 110 to search the backup data table 244 for an entry for the failed active server 110. The restoring module 237 refers to the differential information name 904 and timestamp 905 of the found entry to obtain identification information and time of generation of the differential information.

The restoring module 237 uses the obtained identification information of the differential information to obtain the differential information from the external storage system 180. The restoring module 237 restores the obtained pieces of differential information to the failover destination auxiliary server 110 in chronological order of the time of generation.

In the case where what is generated is not an individual image itself, a part of the processing of Step S2103 is changed. Specifically, the modified part is processing that follows the identification of the individual image identification information by the restoring module 237 by referring to the individual image name 903 of the found entry.

The restoring module 237 uses the identified individual image identification information to search the individual image configuration table 243 for an entry in which the obtained individual image identification information is stored as the individual image name 801. Based on the MBR image name 802 and file set names 803 and 804 of the found entry, the restoring module 237 identifies information that constitutes the individual image.

The restoring module 237 further obtains the information constituting the individual image from the external storage system 180, and restores the obtained information to the failover destination auxiliary server 110.

As described above, a feature of this invention resides in that a plurality of active servers 110 that share a common configuration for executing a service are included in the same restoration pair 170. Another feature of this invention resides in that a common image restored to the failover destination auxiliary server 110 is determined for each restoration pair 170.

This way, enabling the failover destination auxiliary server 110 to take over a service only reflects the individual image of the failed active server 110 on the common image. In other words, the need to restore different full backup images to the failover destination auxiliary server 110 is eliminated and the time required to switch to the failover destination auxiliary server 110 is accordingly cut short.

Still another feature of this invention resides in that a full backup image that shares a high proportion of common parts with other full backup images is restored as a common image to the relevant auxiliary server 110 in advance.

This minimizes the difference between the common image and full backup images of the respective active servers 110, and consequently minimizes the data size of each individual image. The time required to switch to the failover destination auxiliary server 110 is thus shortened even more.

In addition, a backup image is prevented from becoming obsolete in the first embodiment, where a service state prior to the failure in the active server 110 is restored by reflecting differential information on a common image.

Second Embodiment

In the first embodiment, a common image is determined based on parts common among full backup images. A second embodiment of this invention differs from the first embodiment in that a common image is determined based on an index that indicates the possibility of failure. The following description focuses on the difference from the first embodiment.

The configurations of a computer system, the management server 100, the servers 110, and tables in the second embodiment are the same as those in the first embodiment, and a description thereof is omitted herein.

Common image determining processing of the second embodiment differs from that of the first embodiment.

Figure 22:
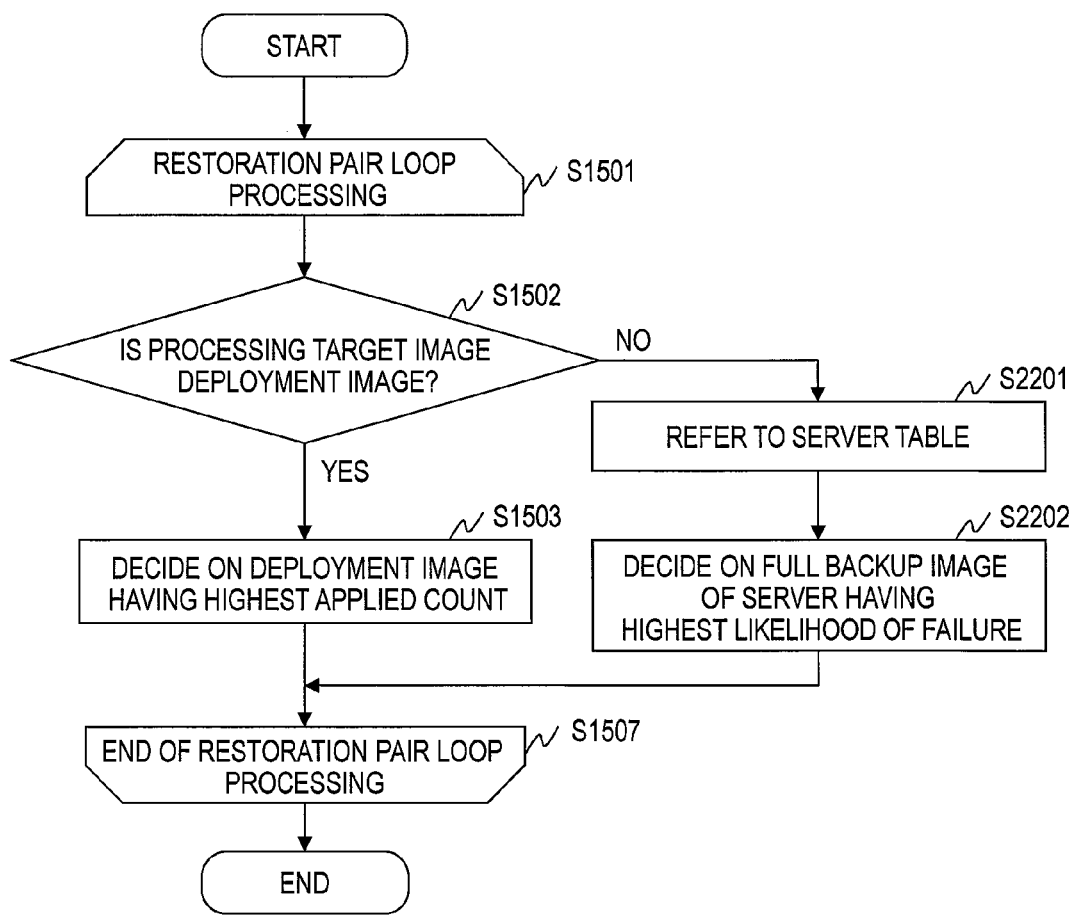
FIG. 22 is a flow chart illustrating an example of the common image determining processing that is executed by the management server in the second embodiment of this invention.

FIG. 22 is a flow chart illustrating an example of the common image determining processing that is executed by the management server 100 in the second embodiment of this invention.

Processing of Steps S1501 to S1503 and processing of Step S1507 in this embodiment are the same as in the first embodiment, and a description thereof is omitted herein.

In the case where it is determined in Step S1502 that not all of the active servers 110 included in the selected restoration pair 170 have full backup images that are deployment images, the common image determining module 233 refers to the server table 221 (Step S2201) and determines, as a common image, a full backup image of the active server 110 that has a highest possibility of failure (Step S2202).

Specifically, the common image determining module 233 refers to the restoration pair table 241 to identify an entry for the selected restoration pair 170. The common image determining module 233 refers to the priority order 605 of the identified entry and selects the active server 110 that has the smallest value of the priority order 605. The common image determining module 233 determines a full backup image of the selected active server 110 as a common image.

In this embodiment, the priority order 605 is determined based on the read error count or the like, and can therefore serve as an index indicating the possibility of failure.

The rest of the processing is the same as in the first embodiment, and a description thereof is omitted herein.

According to the second embodiment, a full backup image of the active server 110 that has a high possibility of failure is restored as a common image to the failover destination auxiliary server 110, thereby accomplishing quick switching from this active server 110 to the failover destination auxiliary server 110.

The first embodiment and the second embodiment may be combined. In an example of the combined embodiment, the common image determining module 233 may determine a common image based on parts common among full backup images in a case of constructing a service system, and determine a common image based on the priority order 605 in a case of running a service system.

Various software described in this embodiment can be stored in electromagnetic, electronic or optical type etc various recording media (for example, a non-transitory storage medium), and can be downloaded to a computer through network, such as the Internet.

Although this embodiment described has been described the example using control by software, it is also possible to realize a part of the function provided software by hardware.

This invention has been described in detail with reference to the accompanying drawings. However, those concrete configurations are not to limit this invention, and this invention encompasses various modifications and equivalent configurations within the spirit of the scope of claims set forth below.

What is claimed is:

1. A computer system, comprising:

a plurality of computers; and a management computer for managing a cluster which includes the plurality of computers, wherein each of the plurality of computers has a first processor, a first memory coupled to the first processor, a storage device coupled to the first processor, and a first network interface coupled to the first processor, wherein the management computer has a second processor, a second memory coupled to the second processor, and a second network interface coupled to the second processor, wherein the plurality of computers constituting the cluster include a plurality of first computers each of which uses the storage device to execute a service and a plurality of second computers for taking over the service that is executed by one of the plurality of first computers that has failed, wherein the management computer includes:

a backup obtaining module for obtaining a backup image from each of the plurality of first computers; and a restoration pair management module for generating a plurality of restoration pairs each of which is constituted of at least one first computer and at least one second computer, and selecting, for each of the plurality of restoration pairs, a common image to be restored to the at least one second computer included in the restoration pair, wherein the management computer holds server management information for managing hardware configuration information and software configuration information for each of the plurality of computers constituting the cluster, and wherein the restoration pair management module is configured to:

refer to the server management information and sort the plurality of first computers into a plurality of groups of first computers by which a software configuration for providing the service is common, in a case where a change in the configuration of the cluster is detected;

refer to the server management information and allocate at least one second computer to each of the plurality of groups based on the hardware configuration information of each of the plurality of first computers and the hardware configuration information of each of the plurality of second computers;

generate at least one restoration pair for each of the plurality of groups by associating at least one first computer that is included in one group with at least one second computer that is allocated to the one group;

determine the common image for each of the plurality of restoration pairs out of the backup image of the at least one first computer included in the restoration pair; and generate a piece of restoration pair management information that associates identification information of the restoration pair, identification information of the at least one first computer included in the restoration pair, identification information of the at least one second computer included in the restoration pair, and identification information of the common image of the restoration pair with one another.

2. The computer system according to claim 1, wherein each of the plurality of restoration pairs includes more than one of the plurality of first computers, and wherein the restoration pair management module is configured to:

select a processing target restoration pair out of the plurality of restoration pairs, in a case of selecting the common image;

compare the backup image of each of the plurality of first computers that are included in the selected restoration pair to calculate common parts;

choose, as the common image, the backup image of the first computer that has a largest proportion of the common parts based on results of the calculation; and restore the chosen common image to the at least one second computer that is included in the selected restoration pair.

3. The computer system according to claim 2, wherein the management computer is coupled to a storage system which has a control unit, an I/O interface, and a plurality of storage devices, and which stores the backup image of each of the plurality of first computers, wherein the management computer holds backup image management information which associates, for each of the plurality of first computers, identification information of the first computer with identification information of the backup image of the first computer, and wherein the restoration pair management module is configured to:

select a processing target restoration pair out of the plurality of restoration pairs;

identify the backup image of each of the plurality of first computers that are included in the selected restoration pair, and the common image of the selected restoration pair based on the restoration pair management information and the backup image management information;

compare the identified backup image of each of the plurality of first computers against the identified common image to obtain a plurality of pieces of first differential information;

generate a plurality of individual images for restoring a state of the service, executed by each of the plurality of first computers, by being reflected in the common image based on the obtained plurality of pieces of first differential information; and store the plurality of generated individual images in the storage system.

4. The computer system according to claim 3, wherein the management computer includes:

a failover destination server determining module for determining the second computer of a failover destination out of the at least one second computer included in the restoration pair which the failed first computer is included, in a case where a failure is detected in one of the plurality of first computers; and a restoring module for restoring backup data in order to restore a state of the service executed by the failed first computer, wherein the management computer holds backup data management information which associates, for each of the plurality of first computers, identification information of the first computer, identification information of a common image, and identification information of an individual image, wherein the failover destination server determining module is configured to:

refer to the restoration pair management information and identify the restoration pair which the failed first computer is included based on identification information of
the failed first computer; and
select the second computer of the failover destination out
of the at least one second computer included in the
identified restoration pair, and
wherein the restoring module is configured to:
refer to the backup data management information and
obtain the individual image of the failed first computer
from the storage system based on the identification
information of the failed first computer; and
restore the state of the service executed by the failed first
computer by reflecting the obtained individual image on
the common image which is stored in the selected second computer.

5. The computer system according to claim 4,
wherein each of the plurality of first computers includes a
differential information obtaining module which obtains
differential data generated in the storage device as second differential information and which transmits the
obtained second differential information to the management computer,
wherein the management computer is configured to:
store the received second differential information in the
storage system, in a case where the second differential
information is received during a period between obtainment of the backup image and next obtainment of the
backup image; and
store identification information of the second differential
information in the backup data management information in association with a time of generation of the second differential information and identification information of the first computer that transmitted the second
differential information, and
wherein the restoring module is configured to:
after reflecting the obtained individual image on the common image stored in the selected second computer, refer
to the backup data management information and obtain,
from the storage system, the second differential information received from the failed first computer; and
restore the state of service executed by the failed first
computer by reflecting the obtained second differential
information on the common image, in chronological
order of time of generation of the obtained second differential information.

6. The computer system according to claim 1,
wherein each of the plurality of restoration pairs includes
more than one of the plurality of first computers,
wherein the server management information includes
operation history information which indicates operating
states of the plurality of first computers, and
wherein the restoration pair management module is configured to:
select a processing target restoration pair out of the plurality of restoration pairs, in a case of selecting the common
image;
refer to the server management information and obtain
pieces of the operation history information of the plurality of first computers that are included in the selected
restoration pair;
identify the first computer that has a high possibility of
failure based on the obtained pieces of the operation
history information;
choose, as the common image, the backup image of the
identified first computer; and
restore the chosen common image to the at least one second
computer that is included in the selected restoration pair.

7. The computer system according to claim 6,
wherein the management computer is coupled to a storage
system which has a control unit, an I/O interface, and a
plurality of storage devices, and which stores the backup
image of each of the plurality of first computers,
wherein the management computer holds backup image
management information which associates, for each of
the plurality fo first computers, identification information of the first computer with identification information
of the backup image of the first computer, and
wherein the restoration pair management module is configured to:
select a processing target restoration pair out of the plurality of restoration pairs;
identify the backup image of each of the plurality of first
computers that are included in the selected restoration
pair, and the common image of the selected restoration
pair based on the restoration pair management information and the backup image management information;
compare the identified backup image of each of the plurality of first computers against the identified common
image to obtain a plurality of pieces of first differential
information;
generate a plurality of individual images for restoring a
state of the service, executed by each of the plurality of
first computers, by being reflected in the common image
based on the obtained plurality of pieces of first differential information; and
store the plurality of generated individual images in the
storage system.

8. The computer system according to claim 6,
wherein the management computer includes:
a failover destination server determining module for determining the second computer of a failover destination out
of the at least one second computer included in the
restoration pair which the failed first computer is
included, in a case where a failure is detected in one of
the plurality of first computers; and
a restoring module for restoring backup data in order to
restore a state of the service executed by the failed first
computer,
wherein the management computer holds backup data
management information which associates, for each of
the plurality of first computers, identification information of the first computer, identification information of a
common image, and identification information of an
individual image,
wherein the failover destination server determining module is configured to:
refer to the restoration pair management information and
identify the restoration pair which the failed first computer is included based on identification information of
the failed first computer; and
select the second computer of the failover destination out
of the at least one second computer included in the
identified restoration pair, and
wherein the restoring module is configured to:
refer to the backup data management information and
obtain the individual image of the failed first computer
from the storage system based on the identification
information of the failed first computer; and
restore the state of the service executed by the failed first
computer by reflecting the obtained individual image on
the common image which is stored in the selected second computer.

9. The computer system according to claim 8,
wherein each of the plurality of first computers includes a differential information obtaining module which obtains differential data generated in the storage device as second differential information and which transmits the obtained second differential information to the management computer,
wherein the management computer is configured to:
store the received second differential information in the storage system, in a case where the second differential information is received during a period between obtainment of the backup image and next obtainment of the backup image; and
store identification information of the second differential information in the backup data management information in association with a time of generation of the second differential information and identification information of the first computer that transmitted the second differential information, and
wherein the restoring module is configured to:
after reflecting the obtained individual image on the common image stored in the selected second computer, refer to the backup data management information and obtain, from the storage system, the second differential information received from the failed first computer; and
restore the state of service executed by the failed first computer by reflecting the obtained second differential information on the common image, in chronological order of time of generation of the obtained second differential information.

10. A cluster management method for a computer system including a cluster which includes a plurality of computers,
the computer system including a management computer for managing the cluster,
each of the plurality of computers having a first processor, a first memory coupled to the first processor, a storage device coupled to the first processor, and a first network interface coupled to the first processor,
the management computer having a second processor, a second memory coupled to the second processor, and a second network interface coupled to the second processor,
the plurality of computers constituting the cluster include a plurality of first computers each of which uses the storage device to execute a service and a plurality of second computers for taking over the service that is executed by the failed first computer in a case where a failure occurs in one of the plurality of first computers,
the management computer including:
a backup obtaining module for obtaining a backup image from each of the plurality of first computers; and
a restoration pair management module for generating a plurality of restoration pairs each of which includes at least one first computer and at least one second computer, and selecting, for each of the plurality of restoration pairs, a common image to be restored to the at least one second computer included in the restoration pair,
the management computer holds server management information for managing hardware configuration information and software configuration information for each of the plurality of computers constituting the cluster,
the cluster management method including:
a first step of referring to, by the restoration pair management module the server management information and sorting the plurality of first computers into a plurality of groups of first computers by which a software configuration for providing the service is common, in a case where a change in the configuration of the cluster is detected;
a second step of referring to, by the restoration pair management module, the server management information and allocating at least one second computer to each of the plurality of groups based on the hardware configuration information of each of the plurality of first computers and the hardware configuration information of each of the plurality of second computers;
a third step of generating, by the restoration pair management module, at least one restoration pair for each of the plurality of groups by associating at least one first computer that is included in one group with at least one second computer that is allocated to the one group;
a fourth step of determining, by the restoration pair management module, the common image for each of the plurality of restoration pairs out of the backup image of the at least one first computer included in the restoration pair; and
a fifth step fo generating, by the restoration pair management module, a piece of restoration pair management information that associates identification information of the restoration pair, identification information of the at least one first computer included in the restoration pair, identification information of the at least one second computer included in the restoration pair, and identification information of the common image of the restoration pair with one another.

11. The cluster management method according to claim 10,
wherein each of the plurality of restoration pairs includes more than one of the plurality of first computers, and
wherein the fourth step includes:
selecting a processing target restoration pair out of the plurality of restoration pairs;
comparing the backup image of each of the plurality of first computers that are included in the selected restoration pair to calculate common parts;
choosing, as the common image, the backup image of the first computer that has a largest proportion of the common parts based on results of the calculation; and
restoring the chosen common image to the at least one second computer that is included in the selected restoration pair.

12. The cluster management method according to claim 11,
wherein the management computer is coupled to a storage system which has a control unit, an I/O interface, and a plurality of storage devices, and which stores the backup image of each of the plurality of first computers,
wherein the management computer holds backup image management information which associates, for each of the plurality of first computers, identification information of the first computer with identification information of the backup image of the first computer, and
wherein the cluster management method includes:
selecting, by the restoration pair management module, a processing target restoration pair out of the plurality of restoration pairs;
identifying, by the restoration pair management module, the backup image of each of the plurality of first computers that are included in the selected restoration pair, and the common image of the selected restoration pair based on the restoration pair management information and the backup image management information;
comparing, by the restoration pair management module, the identified backup image of each of the plurality of first computers against the identified common image to obtain a plurality of pieces of first differential information;

generating, by the restoration pair management module, a plurality of individual images for restoring a state of the service executed by each of the plurality of first computers by being reflected in the common image based on the obtained pieces of first differential information are reflected; and storing, by the restoration pair management module, the plurality of generated individual images in the storage system.

13. The cluster management method according to claim 12, wherein the management computer includes:

a failover destination server determining module for determining the second computer of a failover destination out of the at least one second computer included in the restoration pair which the failed first computer is included, in a case where a failure is detected in one of the plurality of first computers; and a restoring module for restoring backup data in order to restore a state of the service executed by the failed first computer, wherein the management computer holds backup data management information which associates, for each of the plurality of first computers, identification information of the first computer, identification information of a common image, and identification information of an individual image, and wherein the cluster management method includes:

referring to, by the failover destination server determining module, the restoration pair management information and identifying the restoration pair which the failed first computer is included based on identification information of the failed first computer;

selecting, by the failover destination server determining module, the second computer that serves of the failover destination out of the at least one second computer that is included in the identified restoration pair;

referring to, by the restoring module, the backup data management information and obtaining the individual image of the failed first computer from the storage system based on the identification information of the failed first computer; and restoring, by the restoring module, the state of the service executed by the failed first computer by reflecting the obtained individual image on the common image which is stored in the selected second computer.

14. The cluster management method according to claim 13, wherein each of the plurality of first computers includes a differential information obtaining module which obtains differential data generated in the storage device as second differential information and which transmits the obtained second differential information to the management computer, and wherein the cluster management method includes:

storing, by the management computer, the received second differential information in the storage system, in a case where the second differential information is received during a period between obtainment of the backup image and next obtainment of the backup image;

storing, by the management computer, identification information of the second differential information in the backup data management information in association with a time of generation of the second differential information and identification information of the first computer that has transmitted the second differential information;

after reflecting the obtained individual image on the common image stored in the selected second computer, referring to, by the restoring module, the backup data management information and obtaining, from the storage system, the second differential information received from the failed first computer; and restoring, by the restoring module, the state of the service executed by the failed first computer by reflecting the obtained second differential information on the common image, in chronological order of time of generation of the obtained second differential information.

15. The cluster management method according to claim 10, wherein each of the plurality of restoration pairs includes more than one of the plurality of first computers, wherein the server management information includes operation history information which indicates operating states of the plurality of first computers, and wherein the fourth step includes:

selecting a processing target restoration pair out of the plurality of restoration pairs;

referring to the server management information and obtaining pieces of the operation history information of the plurality of first computers that are included in the selected restoration pair;

identifying the first computer that has a high possibility of failure based on the obtained pieces of the operation history information;

choosing, as the common image, the backup image of the identified first computer; and restoring the chosen common image to the at least one second computer that is included in the selected restoration pair.

16. A management computer for managing a cluster which includes a plurality of computers, each of the plurality of computers having a first processor, a first memory coupled to the first processor, a storage device coupled to the first processor, a first network interface coupled to the first processor, and a first I/O interface coupled to the first processor, the management computer comprising a second processor, a second memory coupled to the second processor, and a second network interface coupled to the second processor, the plurality of computers constituting the cluster including a plurality of first computers each of which uses the storage device to execute a service and a plurality of second computers for taking over the service that is executed by one of the plurality of first computers that has failed, the management computer comprising:

a backup obtaining module for obtaining a backup image from each of the plurality of first computers; and a restoration pair management module for generating a plurality of restoration pairs each of which comprises at least one first computer and at least one second computer, and selecting, for each of the plurality of restoration pairs, a common image to be restored to the at least one second computer included in the restoration pair, wherein the management computer holds server management information for managing hardware configuration information and software configuration information for each of the plurality of computers constituting the cluster, and wherein the restoration pair management module is configured to:
refer to the server management information to obtain software configuration information of each of the plurality of first computers, in a case where a change in the configuration of the cluster is detected;
sort the plurality of first computers into a plurality of groups of first computers by which a software configuration for providing the service is common, based on the obtained software configuration information of each of the plurality of first computers;
refer to the server management information to obtain hardware configuration information of each of the plurality of first computers and hardware configuration information of each of the plurality of second computers;
allocate at least one second computer to each of the plurality of groups, based on the obtained hardware configuration information of each of the plurality of first computers and the obtained hardware configuration information of each of the plurality of second computers;
generate at least one restoration pair for each of the plurality of groups by associating at least one first computer that is included in one group with at least one second computer that is allocated to the one group;
determine the common image for each of the plurality of restoration pairs out of the backup image of the at least one first computer included in the restoration pair; and
generate a piece of restoration pair management information that associates identification information of the restoration pair, identification information of the at least one first computer included in the restoration pair, identification information of the at least one second computer included in the restoration pair, and identification information of the common image of the restoration pair with one another.

17. The management computer according to claim 16,
wherein each of the plurality of restoration pairs includes more than one of the plurality of first computers, and
wherein the restoration pair management module is configured to:
select a processing target restoration pair out of the plurality of restoration pairs, in a case of selecting the common image;
compare the backup image of each of the plurality of first computers that are included in the selected restoration pair to calculate common parts;
choose, as the common image, the backup image of the first computer that has a largest proportion of the common parts based on results of the calculation; and
restore the chosen common image to the at least one second computer that is included in the selected restoration pair.

18. The management computer according to claim 16,
wherein each of the plurality of restoration pairs includes more than one of the plurality of first computers,
wherein the server management information includes operation history information which indicates operating states of the plurality of first computers, and
wherein the restoration pair management module is configured to:
select a processing target restoration pair out of the plurality of restoration pairs, in a case of selecting the common image;
refer to the server management information and obtain pieces of the operation history information of the plurality of first computers that are included in the selected restoration pair;
identify the first computer that has a high possibility of failure based on the obtained pieces of the operation history information;
choose, as the common image, the backup image of the identified first computer; and
restore the chosen common image to the at least one second computer that is included in the selected restoration pair.

* * * * *